US010810021B2

(12) United States Patent
Yu et al.

(10) Patent No.: US 10,810,021 B2
(45) Date of Patent: *Oct. 20, 2020

(54) METHODS AND SYSTEM FOR STORAGE RETREIVAL

(71) Applicants: Jay JieBing Yu, San Diego, CA (US); Matthew Sivertson, San Diego, CA (US); Vinay Kumar, San Diego, CA (US)

(72) Inventors: Jay JieBing Yu, San Diego, CA (US); Matthew Sivertson, San Diego, CA (US); Vinay Kumar, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/183,302

(22) Filed: Nov. 7, 2018

(65) Prior Publication Data

US 2019/0073229 A1 Mar. 7, 2019

Related U.S. Application Data

(63) Continuation of application No. 14/555,505, filed on Nov. 26, 2014, now Pat. No. 10,175,997.

(51) Int. Cl.
*G06F 16/00* (2019.01)
*G06F 9/445* (2018.01)
(Continued)

(52) U.S. Cl.
CPC ............ *G06F 9/44521* (2013.01); *G06F 8/38* (2013.01); *G06F 9/451* (2018.02); *G06F 9/45508* (2013.01)

(58) Field of Classification Search
CPC ........ G06F 9/44521; G06F 9/451; G06F 8/38; G06F 9/45508
See application file for complete search history.

(56) References Cited

U.S. PATENT DOCUMENTS 6,754,668 B2    6/2004    Noble et al.
7,133,895 B1   11/2006    Lee et al.
(Continued)

FOREIGN PATENT DOCUMENTS

JP       2009217676 A    9/2009
KR     20090042018 A    4/2009

OTHER PUBLICATIONS

International Search Report and Written Opinion issued in corresponding PCT/US2014/072553 dated Jun. 30, 2015 (8 pages).
(Continued)

*Primary Examiner* — Cheryl Lewis
(74) *Attorney, Agent, or Firm* — Ferguson Braswell Fraser Kubasta PC

(57) ABSTRACT

A method for storage retrieval, including receiving a request for application content. The request includes a first field identifier. The method further includes submitting a query to a content repository, for each asset including the first field identifier, receiving a first asset including the first field identifier and a second asset including the first field identifier, and extracting a first variability tag from the first asset and a second variability tag from the second asset based on the first asset having a matching asset property value to the second asset. The first asset and second asset are scored based at least on the first variability tag and at least on the second variability tag to obtain a first and second score, respectively. The method further includes selecting the first asset based on the first score and the second score, and transmitting the first asset as the application content.

25 Claims, 14 Drawing Sheets

(51) Int. Cl.
*G06F 9/451* (2018.01)
*G06F 8/38* (2018.01)
*G06F 9/455* (2018.01)

(56) References Cited

U.S. PATENT DOCUMENTS

| | | |
|---|---|---|
| 7,149,776 B1 | 12/2006 | Roy et al. |
| 7,194,473 B1 | 3/2007 | Hichwa et al. |
| 7,712,023 B1 | 5/2010 | Bryan |
| 8,356,276 B2 | 1/2013 | Bender |
| 8,538,811 B2 | 9/2013 | Higgins et al. |
| 8,924,269 B2 | 12/2014 | Seubert et al. |
| 8,930,253 B1 | 1/2015 | Ball |
| 2001/0011250 A1 | 8/2001 | Paltenghe et al. |
| 2002/0165880 A1 | 11/2002 | Hornsby et al. |
| 2003/0225829 A1 | 12/2003 | Pena et al. |
| 2004/0135807 A1 | 7/2004 | Pickering et al. |
| 2005/0114361 A1 | 5/2005 | Roberts et al. |
| 2006/0041546 A1 | 2/2006 | Ahn |
| 2006/0242124 A1 | 10/2006 | Fields et al. |
| 2007/0050778 A1 | 3/2007 | Lee et al. |
| 2007/0073683 A1 | 3/2007 | Kobayashi et al. |
| 2007/0078925 A1 | 4/2007 | Neil et al. |
| 2007/0162274 A1 | 7/2007 | Ruiz et al. |
| 2007/0238475 A1 | 10/2007 | Goedken |
| 2008/0097816 A1 | 4/2008 | Freire et al. |
| 2009/0042018 A1 | 2/2009 | Imholt et al. |
| 2009/0100425 A1 | 4/2009 | Russell |
| 2010/0317322 A1 | 12/2010 | Underwood et al. |
| 2011/0023016 A1 | 1/2011 | Khader et al. |
| 2011/0154305 A1 | 6/2011 | LeRoux et al. |
| 2011/0282714 A1 | 11/2011 | Cullen, III et al. |
| 2012/0084185 A1 | 4/2012 | Ciaramitaro et al. |
| 2012/0109792 A1 | 5/2012 | Eftekhari et al. |
| 2012/0226708 A1 | 9/2012 | Srinivasa et al. |
| 2012/0323889 A1 | 12/2012 | Marum et al. |
| 2013/0117351 A1 | 5/2013 | Zoheir et al. |
| 2013/0144715 A1* | 6/2013 | Kranzley ............ G06Q 20/387 705/14.49 |
| 2013/0159228 A1 | 6/2013 | Meijer et al. |
| 2013/0283305 A1 | 10/2013 | Hirsch et al. |
| 2013/0297489 A1* | 11/2013 | Showalter ............ G06Q 40/025 705/38 |
| 2014/0052608 A1 | 2/2014 | McDonald et al. |
| 2014/0067557 A1 | 3/2014 | van Niekerk et al. |
| 2014/0125672 A1 | 5/2014 | Winternitz et al. |
| 2014/0129397 A1 | 5/2014 | Lazerson |
| 2014/0136955 A1 | 5/2014 | Lee et al. |
| 2014/0201616 A1 | 7/2014 | Turner et al. |
| 2014/0229814 A1 | 8/2014 | Wright et al. |
| 2014/0280515 A1 | 9/2014 | Wei et al. |
| 2015/0310052 A1 | 10/2015 | Konik et al. |
| 2016/0027107 A1 | 1/2016 | McDonald et al. |
| 2016/0078567 A1 | 3/2016 | Goldman et al. |
| 2016/0092994 A1 | 3/2016 | Roebuck et al. |

OTHER PUBLICATIONS

International Search Report and Written Opinion issued in corresponding application No. PCT/US2014/072559 dated Jul. 28, 2015 (8 pages).
International Search Report and Written Opinion issued in corresponding application No. PCT/US2014/072535 dated Jul. 29, 2015 (11 pages).
International Search Report and Written Opinion issued in corresponding application No. PCT/US2014/072543 dated Jul. 29, 2015 (11 pages).
International Search Report and Written Opinion issued in the corresponding International Application No. PCT/US2014/053168, dated Apr. 30, 2015 (11 pages).
Office Action in related Canadian Application No. 2,966,388 dated Jun. 1, 2017 (6 pages).
Examination Report No. 2 issued in related Australian Application No. 2014377370 dated Feb. 28, 2017 (3 pages).
Examination Report No. 1 issued in counterpart Australian Patent Application No. 2014412698, dated Nov. 13, 2017 (4 pages).
Extended European Search Report issued in corresponding European Application No. 14906785.2 dated Jun. 6, 2018 (12 pages).
Gitana Software Inc., "Alpaca—HTML5 Forms for JQuery—Form Buttons", Jun. 5, 2014, Retrieved from the Internet on Apr. 9, 2018: URL:https://web.archive.org/web/20140605100521/http://alpacajs.org:80/examples/components/form-controls/buttons.html (2 pages).
Gitana Software Inc., "Alpaca—Easy Forms for JQuery—Tools & Addons", Jun. 25, 2014, Retrieved from the Internet on Apr. 9, 2018: URL:https://web.archive.org/web/20140625105117/http://alpacajs.org/web/resources.html (1 page).
Anonymous: "Gitana/alpaca. GitHub Readme.md", Oct. 16, 2013, Retrieved from the Internet on Apr. 9, 2018: URL: https://web.archive.org/web/20131016124514/https://github.com/gitana/alpaca (4 pages).
Anonymous: "Content of save.php", Oct. 16, 2013, Retrieved from the Internet on Apr. 9, 2018: URL:https://web.archive.org/web/20131016124514/https://github.com/gitana/alpaca/archive/master.zip (1 page).
Anonymous: "jQuery Mobile—Wikipedia", Aug. 6, 2014, Retrieved from the Internet on Apr. 10, 2018: URL:https://en.wikipedia.org/w/index.php?title=jQuery_Mobile&oldid=620090108 (9 pages).

* cited by examiner

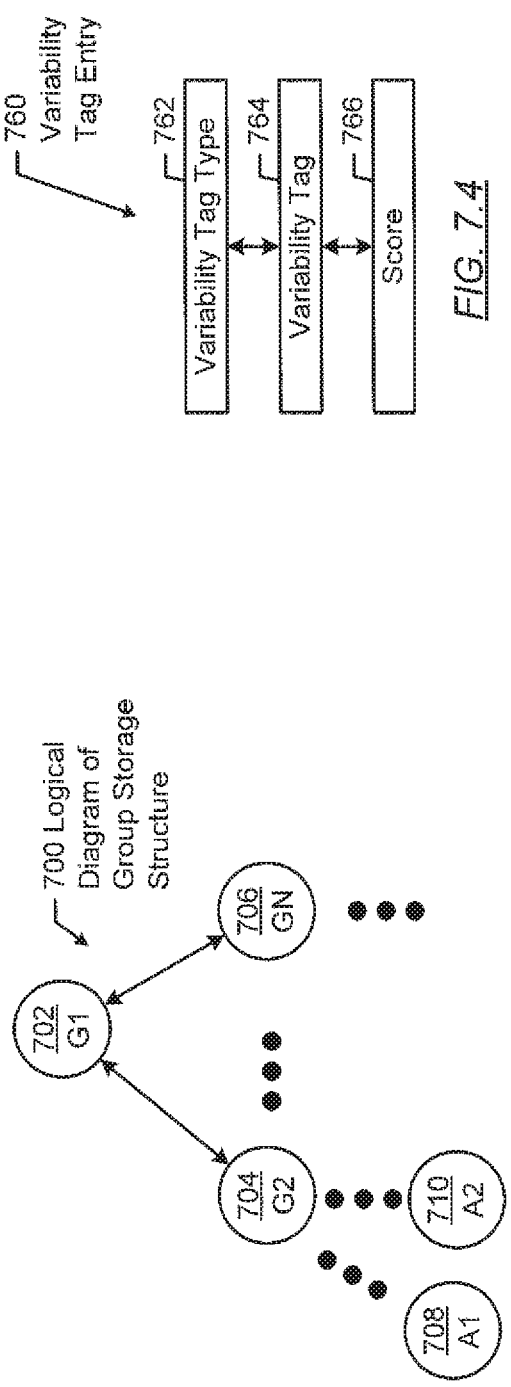
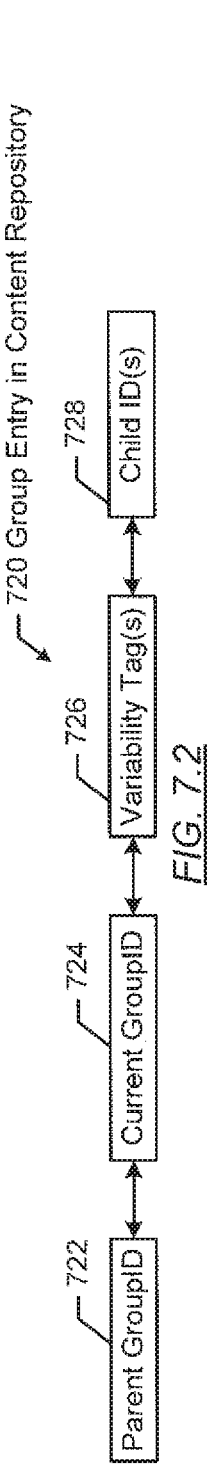
FIG. 7.1
FIG. 7.2
FIG. 7.3
FIG. 7.4

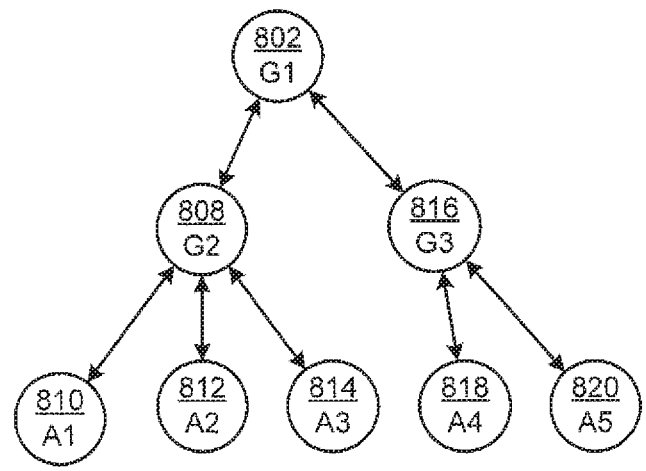
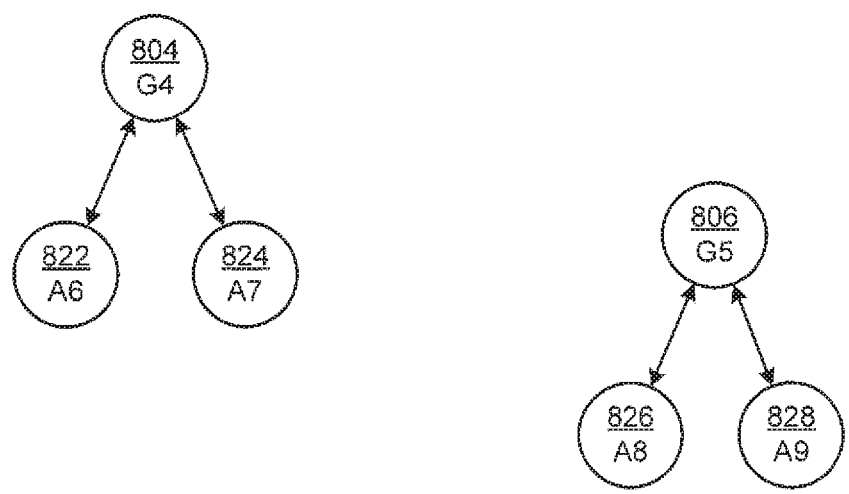
FIG. 8

TOPIC CONTEXT
1202

Federal Taxes

CATEGORY TITLE
1204

Unemployment (and Paid Family Leave)

EXPLANATION
1206

Unemployment and paid family leave benefits are both considered income and both sent to you on a Form 1099-G.

If you got a 1099-G for a state refund, don't enter that here. We'll ask about that later in Other Common Income.

PROMPT DESCRIPTION
1208

Did you receive unemployment or paid family leave benefits on a 1099-G in 2013?

AFFIRMATIVE DESCRIPTION
1212

○ Yes, we received unemployment or paid family leave on a 1099-G.
○ No, we didn't receive any of these payments on a 1099G.

NEGATIVE DESCRIPTION
1214

FIELD
1210

[ Continue ]

FORWARD NAVIGATION BUTTON
1216

[ Back ]

BACKWARD NAVIGATION BUTTON
1218

*FIG. 12*

1300 EXAMPLE

| ID 1304 | ASSET PROPERTY VALUES 1306 | | VARIABILITY TAGS 1308 | | | ASSET CONTENT 1310 |
|---|---|---|---|---|---|---|
| id | Field | Type | Form | Lan | SKU | Description |
| UUID1 | Group001 | category | large | en | all | Unemployment (and Paid Family Leave) |
| UUID5 | Field001 | help | large | en | all | <p>Unemployment and paid family leave benefits are both considered income and both sent to you on a <b>Form 1099-G</b>.</p> <p>If you got a 1099-G for a state refund, don't enter that here. We will ask about that later in <b>Other Common Income</b>.</p> |
| UUID2 | Field001 | prompt | large | en | all | Did you receive unemployment or paid family leave benefits on a 1099-G in {{tax Year}}? |

| ID 1314 | ASSET PROPERTY VALUES 1316 | | VARIABILITY TAGS 1318 | | | ASSET CONTENT 1320 |
|---|---|---|---|---|---|---|
| id | Field | Option | Form | Lan | SKU | Description |
| UUID3 | Field001 | true | large | en | all | <b>Yes</b>, we received unemployment or paid family leave on a 1099-G. |
| UUID4 | Field001 | false | large | en | all | <b>No</b>, we didn't receive any of those payments on a 1099-G. |

1322 EXAMPLE

| Parent | Child | Topic |
|---|---|---|
| Group001 | Field001 | FederalTax/WagesIncome/1099G |

*FIG. 13*

METHODS AND SYSTEM FOR STORAGE RETREIVAL

CROSS-REFERENCE TO RELATED APPLICATIONS

This application is a continuation of and claims benefit under 35 U.S.C. § 120 to U.S. application Ser. No. 14/555,505, filed Nov. 26, 2014, which is incorporated herein by reference in its entirety.

This application includes subject matter related to U.S. patent application Ser. No. 14/463,415, entitled "Common Declarative Representation of Application Content and User Interaction Content Processed by a User Experience Player", filed Aug. 19, 2014, which is incorporated herein by reference in its entirety. This application further includes subject matter related to: (i) U.S. patent application Ser. No. 14/555,499, entitled "Method and System for Organized User Experience Workflow", and having inventors Matthew Sivertson, Gang Wang, Kevin McCluskey, Vinay Kumar, and Jay JieBing Yu; (ii) U.S. patent application Ser. No. 14/555,493, entitled "Dynamic User Experience Workflow", and having inventors Matthew Sivertson, Gang Wang, Kevin McCluskey, Vinay Kumar, and Jay JieBing Yu; and (iii) U.S. patent application Ser. No. 14/555,486, entitled "Method and System for Generating a Dynamic User Experience", and having inventors Jay JieBing Yu, Matthew Sivertson, Gang Wang, Vinay Kumar, Jeffery Weber, and Bojan Beran, which are all filed on the same day as the present application and all incorporated herein by reference in their entirety.

BACKGROUND

Currently, a great variety of computing device platforms exists. Generally, each type of computing device platform includes platform-specific hardware with varied capabilities, as well as an optional operating system environment in which computer applications may function. A computer application is often designed to work within the construct of an operating system and to work with the operating system to take advantage of at least some aspects of the platform hardware. To this end, computer applications must often be re-designed, at least in part, to be able to function as desired with each of the various operating systems and the platform hardware combinations. In such scenarios, each version of a computer application may require maintaining a separate application code base and separate accompanying programming effort for each environment in which a software vendor wants a computer application to function. The difficulty of such a task increases if the software vendor desires to create a different and/or unique user experience for different platforms on which a computer application is to execute. Alternatively, a software vendor may instead choose to only create one version of an application. The single version of the application may be intended to be deployed along with an execution environment (e.g., web browser, virtual machine, etc.) that is capable of interacting with the underlying operating system and/or platform hardware. In such scenarios, the computer application may not be capable of taking advantage of platform hardware capabilities due to the additional layer of abstraction (i.e., the execution environment) existing between the computer application and the underlying hardware.

SUMMARY

In general, in one aspect, embodiments of the invention relate to a method for storage retrieval, including receiving, from a computing device, a request for application content. The request includes a first field identifier. The method further includes submitting, in response to the request, a query to a content repository, for each asset including the first field identifier, receiving, from the content repository and in response to the query, a first asset including the first field identifier and a second asset including the first field identifier, and extracting a first variability tag from the first asset and a second variability tag from the second asset based on the first asset having a matching asset property value to the second asset. The first asset is scored based at least on the first variability tag to obtain a first score. The second asset is scored based at least on the second variability tag to obtain a second score. The method further includes selecting the first asset based on the first score and the second score, and transmitting, to the computing device, the first asset as the application content.

In general, in one aspect, embodiments of the invention relate to a system for storage retrieval, the system including a content repository including a first storage device including a first asset. The first asset including a first field identifier, a first asset property value, a first variability tag, and a first asset content. The content repository includes a second storage device including a second asset including the first field identifier, the first asset property value, a second variability tag, and a second asset content. The system further includes a first computing device for executing an asset context loader. The asset context loader is configured to receive, from a second computing device, a request for application content. The request includes the first field identifier. The asset content loader is further configured to submit, in response to the request, a query to the content repository, for each asset including the first field identifier, receive, from the content repository and in response to the query, the first asset and the second asset, extract the first variability tag from the first asset and the second variability tag from the second asset based on the first asset property value matching a second asset property value, score the first asset based at least on the first variability tag to obtain a first score, score the second asset based at least on the second variability tag to obtain a second score, select the first asset based on the first score and the second score, and transmit, to the second computing device, the first asset as the application content.

In general, in one aspect, embodiments of the invention relate to a non-transitory computer readable medium for storage retrieval, including computer readable program code embodied therein for receiving a request for application content. The request includes a first field identifier. The computer readable program code is further for submitting, in response to the request, a query to a content repository, for each asset including the first field identifier, receiving, from the content repository and in response to the query, a first asset including the first field identifier and a second asset including the first field identifier, extracting a first variability tag from the first asset and a second variability tag from the second asset based on the first asset having a matching asset property value to the second asset, scoring the first asset based at least on the first variability tag to obtain a first score, scoring the second asset based at least on the second variability tag to obtain a second score, selecting the first asset based on the first score and the second score, and transmitting, to the computing device, the first asset as the application content.

BRIEF DESCRIPTION OF DRAWINGS

FIGS. 7.1, 7.2, 7.3, and 7.4 show logical storage diagrams of the content repository in accordance with one or more embodiments of the invention.

FIG. 8 shows an example relational diagram of assets and groups in accordance with one or more embodiments of the invention.

FIGS. 12 and 13 show an example in accordance with one or more embodiments of the invention.

DETAILED DESCRIPTION

Figure 1:
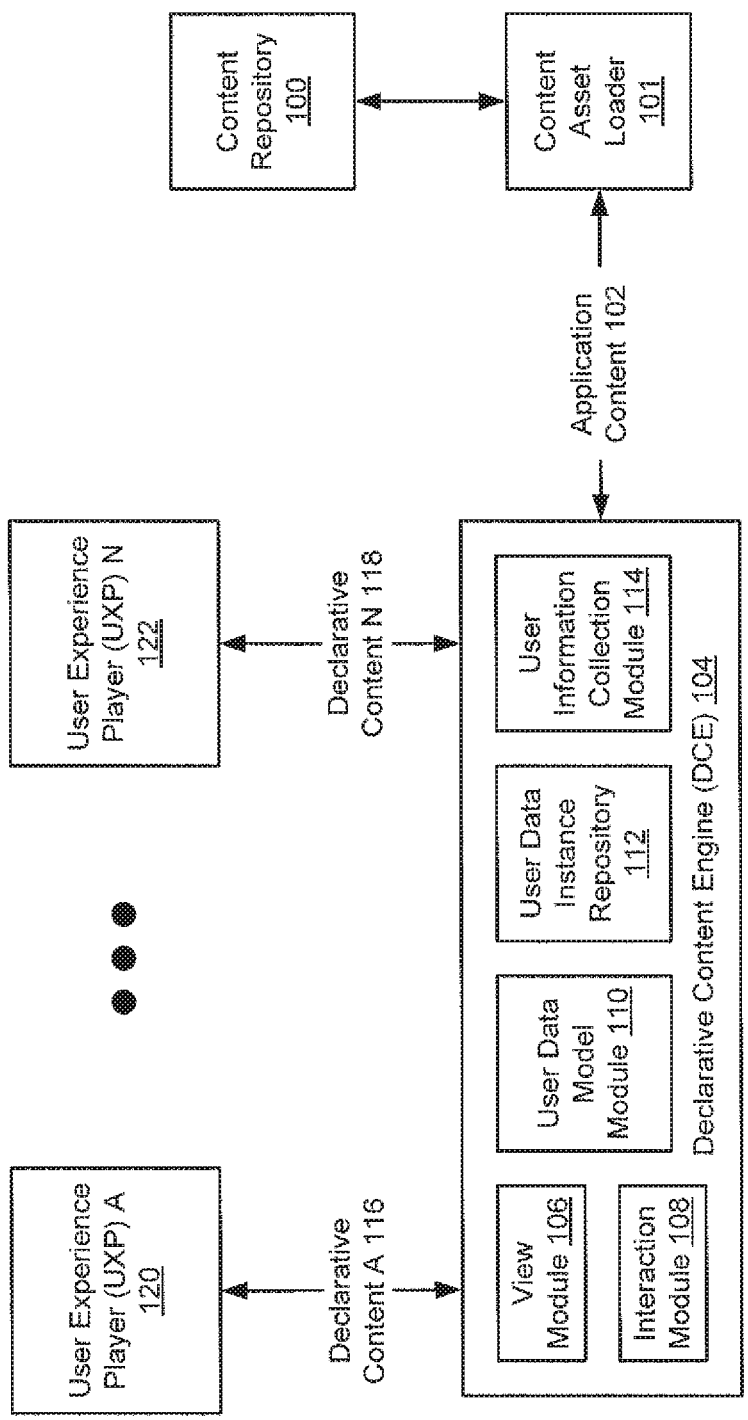
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method for storage retrieval of application content, whereby the application content supports a variety of heterogeneous computing device platforms. In one or more embodiments of the invention, the application content is partitioned into assets, which may be referenced by field identifiers. One or more embodiments of the invention are directed to selecting an asset to transmit to a requesting computing device when multiple assets are associated with the same field identifier. Specifically, in response to a request for application content that includes a field identifier, a query is sent to a content repository for each asset that has the field identifier. Assets returned that have the same field identifier and matching asset property values are scored based on variability tags. Based on the scores, an asset is selected, and application content including the asset is transmitted to the requesting computing device. The requesting computing device may be the same or different than the computing device that is processing the request. If the same computing device is used, then a request is received from the computing device and transmitted to the computing device when the request is received from and transmitted to any hardware, software, and/or firmware component on the computing device.

In one or more embodiments of the invention, the application content is represented to a client device using a declarative content expression that is common between various types of platforms on which an application may execute. Specifically, a declarative content engine includes functionality to request application content, express the application content as at least a portion of declarative content, and transmit the declarative content to any of a variety of computing device types, each of which may include an execution environment such as an operating system.

A computing device combined with an execution environment may be referred to as a platform. In one or more embodiments of the invention, each platform type on which an application may execute has a user experience player designed for the platform that is capable of, at least, interpreting the declarative content to obtain the application content. In such embodiments, the user experience player may include functionality to bind the application content to one or more templates and navigation patterns that are native to the platform type on which the user experience player is executing. The application content may then be displayed by the user experience player to a user of the application. In one or more embodiments of the invention, the user of the application takes actions based on being presented the application content, and the user experience player includes functionality to represent the received user actions as declarative content which may be returned to the declarative content engine.

FIG. 1. shows a system in accordance with one or more embodiments of the invention. In one or more embodiments of the invention, the system includes a content repository (e.g., content repository (100)) and a content asset loader (e.g., content asset loader (101)) from which application content (e.g., application content (102)) may be obtained. In one or more embodiments of the invention, the system also includes a declarative content engine (DCE) (e.g., DCE 104) and one or more user experience players (UXPs) (e.g., UXP A (120), UXP N (122)). The DCE (104) may include a view module (e.g., view module (106)), an interaction module (e.g., interaction module (108)), a user data model module (e.g., user data model module (110)), a user data instance repository (e.g., user data instance repository 112), and a user information collection module (e.g., user information collection module (114)). Each UXP (e.g., UXP A (120), UXP N (122)) may include various modules and interpreters for processing and displaying the declarative content. Each of these components is described below.

In one or more embodiments of the invention, the content repository (100) is a data repository. In one or more embodiments of the invention, the content repository (100) is any type of storage unit and/or device (e.g., a file system, database, collection of tables, or any other storage mechanism) for storing data/information. Specifically, the content repository (100) may include hardware and/or software. Further, the content repository (100) may include multiple different storage units and/or devices. The multiple different storage units and/or devices may or may not be of the same type or located at the same physical site. In one or more embodiments of the invention, the content repository (100) is included as a part of the DCE (104). In other embodiments of the invention, the content repository (100) is a stand-alone repository that is operatively connected to and accessed, at least, by the DCE (104). In one or more embodiments of the invention, the content repository (100) includes functionality to store, at least in part, application content (e.g., application content (102)). Further, the content repository (100) includes functionality to provide, at least indirectly, the application content (102) to at least one DCE (104).

Application content may be content of an application that is executed by a user. For example, application content may inform the experience that is presented to a user. Application content (102) may include, but is not limited to, data related what an end-user of the application may see, data related to the functioning of the application, data related to the flow of an application (e.g., what application content should be presented next based on user feedback such as an answer to a question), metadata (e.g., type information related to data objects included with the application content), and any other types of data that may be used during execution of an application.

In at least some embodiments of the invention, application content is text that is displayable in an application. In such embodiments of the invention, application content may exclude any description of the alignment of the text that is displayed or how the application is executed. In some embodiments, the application content does not include formatting information, rather, the application content is raw text and the function of the text within the application. In other embodiments, the application content is limited to the formatting of font of the text (e.g., bold, italic, font type, etc.) and the paragraph breaks in a multi-paragraph explanation without specifying the alignment of the text in the application. In yet other embodiments of the invention, the application content may include additional formatting. For example, the application content may include, but is not limited to, application data for a tax preparation application, a financial transaction application, and/or a loan request application. In the example, application content may include questions, answer choices, relevant information, help, menu options, titles, and other text that is displayable on a page. In one or more embodiments of the invention, application content is partitioned into assets. Application content and assets are discussed in further detail below and in FIGS. 6, 7.1, 7.2, 7.3, and 7.4.

Application content (102) may be expressed in any format capable of being read by the DCE (104). For example, application content (102) may be expressed in any computer programming language now known or that may later be developed.

In one or more embodiments of the invention, the application content (102) is obtained from the content repository (100) by the operatively connected DCE (104) through the operatively connected asset content loader (101). An asset content loader (101) is any combination of hardware, software, and/or firmware that includes functionality to receive field identifiers, select assets from the content repository (100) based, at least in part, on the field identifiers, and transmit the selected assets as application content (102). Operations performed by the asset content loader are discussed below with reference to FIGS. 9-11.

In one or more embodiments of the invention, the DCE (104) is any combination of hardware, software, and/or firmware that includes functionality to express obtained application content (102) as declarative content (e.g., declarative content A (116), declarative content N (118)) to be sent to a UXP (e.g., UXP A (120), UXP N (122)). For example, the DCE (104) may be a software application executing on a computing device (not shown). In one or more embodiments of the invention, a computing device is any device and/or any set of devices capable of electronically processing instructions and that includes at least the minimum processing power, memory, input and output device(s), network connectivity, and ability to process application content to obtain declarative content to be transmitted to one or more UXPs in order to perform, at least in part, one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, or other mobile device), and/or any other type of computing device with the aforementioned minimum requirements.

In one or more embodiments of the invention, the DCE (104) is a software application written in any programming language that includes instructions stored in any non-transitory computer readable medium. The instructions, when executed by one or more processors in a computing device, enable the computing device to perform the functions described in accordance with one or more embodiments of the invention. In one or more embodiments of the invention, the DCE (104) includes functionality to express application content as declarative content using a declarative programming language (e.g., JavaScript Object Notation (JSON)). In one or more embodiments of the invention, the DCE (104) includes functionality to, at least in part, transmit declarative content to one or more operatively connected (e.g., via computer network (not shown)) UXPs (e.g., UXP A (120), UXP N (122)).

In one or more embodiments of the invention, the DCE (104) includes a view module (106). In one or more embodiments of the invention, a view module (106) is any software, hardware, firmware, and/or combination thereof capable of obtaining view information from the application content and expressing the view information in a declarative programming language. The DCE (104) may also include functionality to interpret view information expressed as declarative content that is received by the DCE (104). View information (not shown) may include information necessary for a logical unit (i.e., a view unit) of presentation but without certain details (e.g., layout, visual control) necessary to render the information. Examples of view information include, but are not limited to, user visible text, data bindings, user action possibilities, hierarchical groupings of artifacts, and semantic relationships between artifacts.

In one or more embodiments of the invention, the DCE (104) includes an interaction module (108). In one or more embodiments of the invention, an interaction module (108) is any software, hardware, firmware, and/or combination thereof capable of obtaining interaction flow and logic information (not shown), and expressing the interaction flow and logic information in a declarative programming language as declarative content. In one or more embodiments of the invention, the interaction module also includes functionality to interpret interaction flow and logic information expressed as declarative content that is received by the DCE (104). Interaction flow and logic information may specify navigation logic, which may be used to determine the next unit of information (e.g., a next view unit) to present to a user of an application upon receiving user actions in response to a current application view (i.e., a current view unit). In one or more embodiments of the invention, the interaction module includes a state machine that is used to model the interaction flow of an application, with nodes representing the view unit, edges representing transitions, and with additional attachments for specifying conditions associated with each transition.

In one or more embodiments of the invention, the DCE (104) includes a user data model module (110). In one or more embodiments of the invention, a user data model module (110) is any software, hardware, firmware, or combination thereof capable of obtaining data model information (not shown) and expressing the data model information in a declarative programming language. In one or more embodiments of the invention, the user data model module (110) also includes functionality to interpret data model information expressed as declarative content that is received by the DCE (104). Data model information may specify the data definition for visible data in a given view unit. In one or more embodiments of the invention, data model information also includes field and/or type information, which may allow a UXP (e.g., UXP A 120) to perform error checks on information entered by a user of an application. In one or more embodiments of the invention, the user data model module (110) may include functionality to use a declarative programming language to express definitions for fields of a view unit. In such an embodiment, the expression of the data model information includes, but is not limited to, an enumeration field that includes all possible enumerated values for a field, the type of the possible values, and validation logic. Such information may allow a UXP to perform various error checks on user actions.

In one or more embodiments of the invention, the DCE (104) includes a user data instance repository (112). In one or more embodiments of the invention, a user data instance repository includes a data repository, similar to the data repository described above, that includes the actual value of user data obtained during a user's use of an application. The user data instance repository (112) may include any software, hardware, firmware, and/or combination thereof capable of obtaining and storing user data instances as well as both expressing and, in some cases, receiving the user data instances in a declarative programming language (e.g., JSON). In one or more embodiments of the invention, the user data instance repository (112) includes functionality to express user data instances as declarative content which the DCE (104) may transmit to a UXP (e.g., UXP A 120), allowing the UXP to maintain an in-memory client-side data store for managing user data instances as needed for the execution of the application. In one or more embodiments of the invention, the user data instance repository (112) also includes functionality to interpret data instances expressed as declarative content that are received by the DCE (104).

In one or more embodiments of the invention, the DCE (104) includes a user information collection module (114). In one or more embodiments of the invention, a user information collection module (114) is any software, hardware, firmware, and/or combination thereof capable of obtaining user information (not shown) and expressing the user information in a declarative programming language. In one or more embodiments of the invention, the user information collection module (114) also includes functionality to interpret user information expressed as declarative content that is received by the DCE (104). User information may include information related to a given user. User information may also include information related to one or more platforms on which a user executes an application. The user information collection module (114) may include functionality to maintain (e.g., store) user information for one or more users of one or more applications. User information may include user specific information such as profession, age, demographics, user emotional state, complexity of a specific user scenario, any other information associated with a user, and/or any combination thereof. User information may also include device information such as platform type (e.g., mobile device, web browser, desktop computer, etc.), operating system type (e.g., iOS, Android, Windows, etc.), and/or device capabilities (e.g., camera, sensors, location awareness, text capabilities, audio capabilities, etc.). In one or more embodiments of the invention, the user information collection module (114) includes functionality to modify the application content requested by the DCE (104) and/or the declarative content provided to a UXP in order to modify the user experience based on the user information. For example, the user experience may be modified by changing the type of information, descriptions of questions, brevity of explanations, available modes of input, etc.

In one or more embodiments of the invention, the DCE (104) transmits declarative content (e.g., declarative content A (116), declarative content N (118)) to one or more UXPs (e.g., UXP A (120), UXP N (122)). In one or more embodiments of the invention, declarative content is content expressed in a declarative programming language. A declarative programming language may generally be used to express the logic of a computation without describing its control flow. Examples of a declarative programming language include, but are not limited to, JSON, structured query language (SQL), Prolog, and Datalog. In one or more embodiments of the invention, declarative content includes application content as well as various other types of information (e.g., interaction flow and logic information) necessary to allow a UXP to render the application content for a user (not shown). In one or more embodiments of the invention, the declarative content includes information expressed in a declarative programming language that is obtained by one or more of the modules and/or repositories included with and/or operatively connected to the DCE (104). Declarative content also includes information expressed in a declarative programming language that is transmitted from a UXP (e.g., UXP A (120), UXP N (122)) to the DCE (104), which may, for example, include information related to user actions and user related information.

In one or more embodiments of the invention, the DCE (104) is operatively connected to one or more UXPs (e.g., UXP A (120), UXP N (122)). The DCE may be operatively connected to the one or more UXPs via a computer network (not shown) such as the Internet. The DCE (104) and the one or more UXPs may be designed to communicate via information expressed in a declarative programming language. In one or more embodiments of the invention, a UXP (e.g., UXP A (120), UXP N (122)) is any software, hardware, firmware, or combination thereof capable of processing declarative content received from a DCE (104), presenting (i.e., rendering) application content to a user, receiving user actions, and transmitting user actions expressed in a declarative programming language to the DCE (104). Interactions between the user of an application and the UXP may occur, at least in part, visually and/or non-visually. Examples of non-visual modes of interaction include, but are not limited to, audio, motion, touch, and electromagnetic. Both the UXP and the user may interact with the other in any of the aforementioned interaction methods. For example, the user may speak words that the UXP processes while the UXP presents information to the user visually. For another example, the UXP may present application content to the user via audio communication while the user communicates with the UXP via eye movement.

In one or more embodiments of the invention, a UXP (e.g., UXP A (120), UXP N (122)) is at least part of a software application written in any programming language that includes instructions stored in any non-transitory computer readable medium. The instructions, when executed by one or more processors in a computing device, enable the computing device to perform the functions described in accordance with one or more embodiments of the invention. In one or more embodiments of the invention, a UXP (e.g., UXP A (120), UXP N (122)) is a user interface (UI) module. In one or more embodiments of the invention, the UXP is a part of the application that a user is executing. In other embodiments of the invention, the UXP is a separate module capable of performing actions on behalf of and/or in conjunction with the application that a user is executing.

A UXP (e.g., UXP A (120), UXP N (122)) may be a computer program, or a portion thereof, designed to execute on a certain platform type or group of platform types. For example, a UXP may be designed to execute on a specific device type (e.g., smart phone) on which a specific operating system type (e.g., Android) executes. For another example, a UXP may be designed to execute on any desktop and/or laptop computer that is executing one of a range of Windows based operating systems (i.e., a Windows based platform type). In one or more embodiments of the invention, the UXP (e.g., UXP A (120), UXP N (122)) executes on any type of computing device, substantially similar to the computing devices described above in relation to the DCE (104). The UXP (e.g., UXP A (120), UXP N (122)) may include functionality to present application content to a user visually (e.g., presenting a graphical user interface (GUI)). In one or more embodiments of the invention, the UXP (e.g., UXP A (120), UXP N (122)) includes functionality to present application content in any non-visual way that is supported by the platform on which the UXP executes. For example, the UXP may include functionality to render application content in ways including, but not limited to, via audio, via a text-based interface (e.g., short message service (SMS) text), via braille, and/or via a virtual reality based interface.

In one or more embodiments of the invention, the UXP (e.g., UXP A (120), UXP (122)) includes a declarative content interpreter for interpreting (i.e., processing) declarative content received from a DCE (104) in order to obtain application content and related information (e.g., interaction flow and logic information, data model information, etc.), which may be referred to as interpreted content.

The UXP (e.g., UXP A (120), UXP (122)) may further include one or more native rendering libraries. As used in this context, a library is a collection of information, behaviors, and/or subroutines with defined interfaces that may be used by any appropriately configured software executing on a platform that includes the library. In one or more embodiments of the invention, a native rendering library is a library in which exists information that allows the UXP (e.g., UXP A (120), UXP N (122)) to render application content on a specific platform on which the UXP and user executed application are executing. For example, a native platform library may include one or more native templates specific to the operating system, web browser, and/or computing device hardware on which the UXP executes. In such an example, the one or more templates may include, but are not limited to, information related to visual and/or non-visual presentation of information as well as navigation patterns and actuators (e.g., buttons to press, drop down lists for selecting from, defined meanings for user swipe actions, etc.). In one or more embodiments of the invention, more than one native library, each including differing native templates and navigation patterns, allows the UXP to render an application differently to a user on the same platform.

In one or more embodiments of the invention, the UXP (e.g., UXP A (120), UXP N (122)) includes a binding module for binding platform-native visual and/or non-visual templates and navigation patterns (i.e., of the aforementioned one or more native rendering libraries) with the declarative content (including application content therein) to be presented to a user as a view unit, and a rendering module for rendering the view unit bound by the binding module to a user of an application. The rendering may include visual aspects, non-visual aspects, or a combination thereof.

In one or more embodiments of the invention, the UXP (e.g., UXP A (120), UXP N (122)) may also include a user action processor for handling user actions, updating one or more local data stores, and performing view unit refresh actions.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, there may be more than one declarative content engine. For another example, there may be any number of user experience players operatively connected to each declarative content engine. Accordingly, embodiments of the invention should not be considered limited to the specific arrangements of modules and elements shown in FIG. 1.

Figure 2:
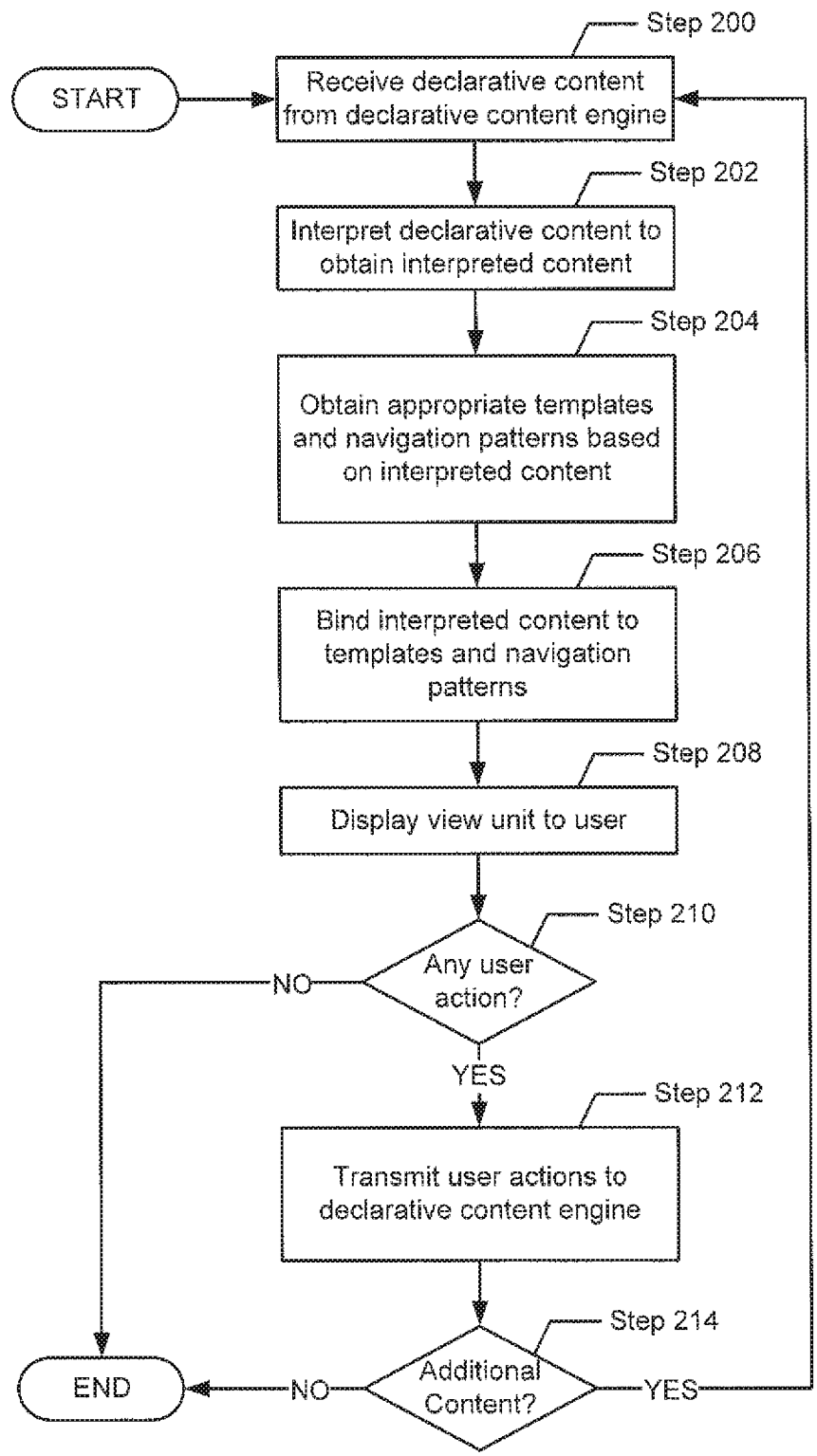
FIG. 2 shows a flowchart in accordance with one or more embodiments of the invention.

FIG. 2 shows a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for processing declarative content from a declarative content engine and rendering application content for a user of an application. In Step 200, declarative content is received at a UXP from a DCE. Declarative content may be expressed in any declarative programming language (e.g., JSON). In one or more embodiments of the invention, the received declarative content includes application content as well as additional related content (e.g., interaction flow and logic information). In one or more embodiments of the invention, the declarative content is received from an operatively connected declarative content engine. For example, the UXP may be executing on a tablet device that is operatively connected to the server on which the DCE executes via a series of wireless and wired networks.

In Step 202, the declarative content is interpreted. In one or more embodiments of the invention, the declarative content is interpreted by a declarative content interpreter, which may be a portion of the UXP. In one or more embodiments of the invention, interpretation of the declarative content includes, but is not limited to, parsing the received declarative content in order to obtain the application content and related content included therein. In one or more embodiments of the invention, interpreting the declarative content also includes making the interpreted content available for use by the other portions of the UXP.

In Step 204, the UXP obtains appropriate templates and navigation patterns based on the interpreted content. In one or more embodiments of the invention, the templates and navigation patterns, which may be visual and/or non-visual, are obtained from one or more native rendering libraries included with and/or operatively connected to the UXP.

In Step 206, the relevant portion of the interpreted content is bound to the one or more templates and navigation patterns obtained in Step 204. In one or more embodiments of the invention, a binding module of the UXP performs the binding. Binding content to templates and navigation patterns may include creating a relationship between portions of the interpreted content and the templates and navigation patterns in order to prepare the content as a view unit for presentation to a user.

In Step 208, a view unit is rendered for a user. In one or more embodiments of the invention, rendering a view unit includes displaying application content to a user of an application. In one or more embodiments of the invention, a rendering module of the UXP includes functionality to render content that has been bound, as in Step 206, to templates and navigation patterns. The rendered view unit may be visual, non-visual, or any combination thereof. For example, a rendered view unit may be a visual presentation of a screen of a tax preparation application. In such an example, the rendered view unit may include, but is not limited to, text, graphics, fields for entering user information, questions to be answered by a user, fields for a user to enter answers to presented questions, actuating buttons for user selections, drop down menus for user selection, or any other information relevant to the tax preparation application that is to be rendered to a user.

In Step 210, a determination is made as to whether any user action was taken in response to the display of the view unit. For example, a user may enter personal data, answer a question, make a selection, press a button, speak a help query, gesture to indicate an answer, switch platforms, change desired mode of interaction (e.g., from visual to non-visual), decide to save and/or pause the application, and/or any other possible form of user action. User actions may be actuated by any means supported by the platform on which a user executes an application that operates in conjunction with a UXP. For example, user action may include, but is not limited to, keyboard input, mouse input, audio input, motion input, and touch input. For another non-limiting example, electromagnetic input may be received from a user via one or more electrodes. User action may be actuated through any form of biometric input. For example, fingerprints and/or eye movements may be used to input a user action. User action may additionally be actuated by any peripheral device that is operatively connected to the platform. For example, glasses or contact lenses may be operatively connected to the platform and used to actuate the receipt of user responses to questions and/or for a user to enter user information into fields of an application. Such a user action may be in response to the view unit rendered and/or may be any other chosen user action supported by the application that the user is executing. In one or more embodiments of the invention, there is a timeout period associated with a given view unit during which a UXP will wait for a user action. In one or more embodiments of the invention, the application will not move forward unless a user action occurs. If one or more user actions occur, then the process moves to Step 212. If a user action does not occur, then the process proceeds to end.

Turning to Step 212, the one or more user actions are transmitted from the UXP to the DCE. In one or more embodiments of the invention, the user actions are expressed in a declarative programming language. For example, the user actions may be expressed as a JSON response. In one or more embodiments of the invention, the transmission of the user action(s) occurs over a network and/or a collection of one or more interconnected networks (e.g., the Internet).

In Step 214, a determination is made as to whether additional declarative content is to be transmitted from the DCE to the UXP that transmitted the user actions. Additional content may be required in response to any user action, in response to a user error, in order to advance through the application, and/or in response to a timeout. Additional content may include, but is not limited to, additional application content, a next view unit, additional interaction flow and logic information, additional data model information, additional data instances, and/or additional user information. If there is no additional content, the process proceeds to end. If there is additional content, the DCE prepares additional declarative content and the process returns to Step 200.

Figure 3:
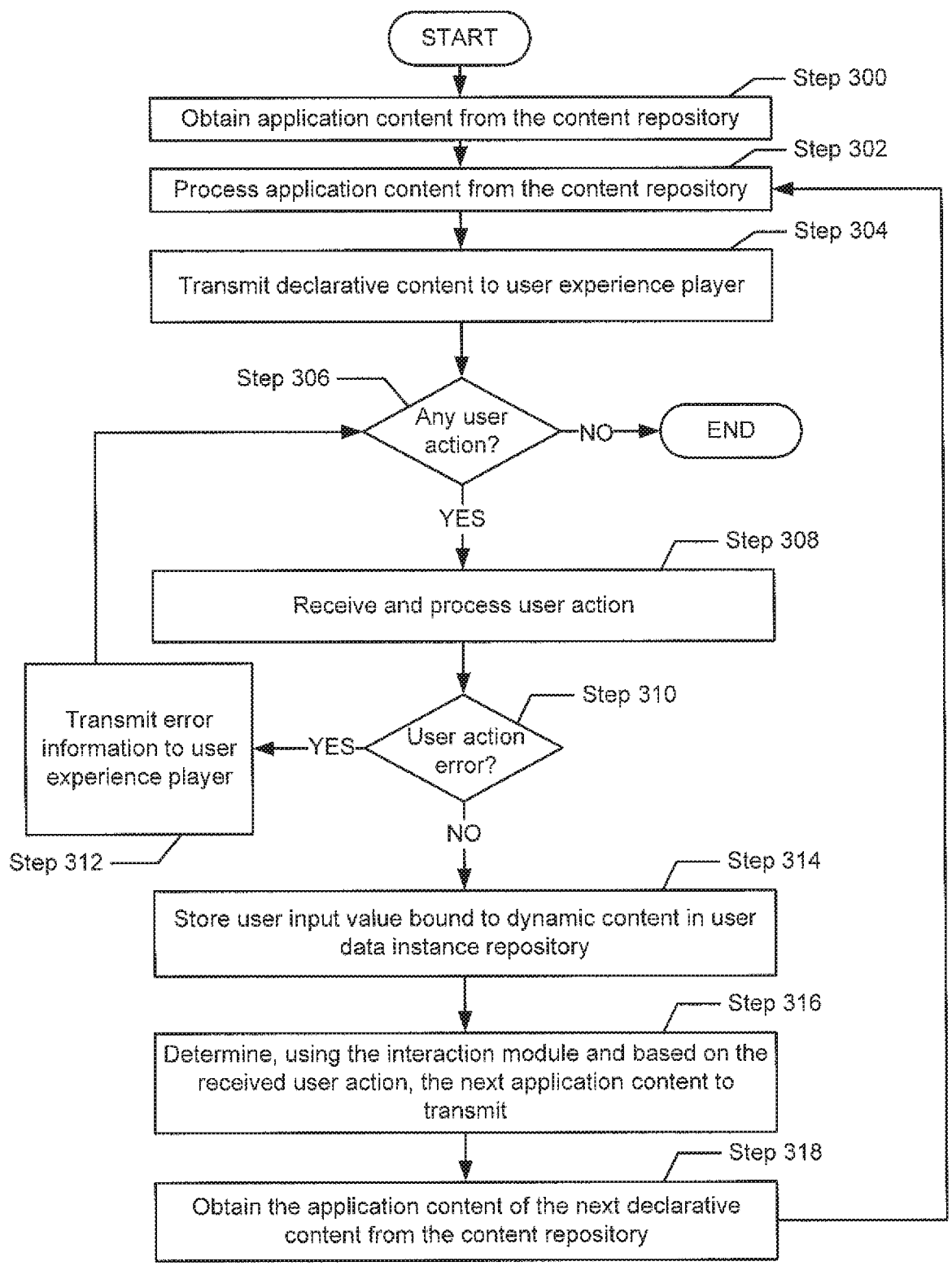
FIG. 3 shows a flowchart in accordance with one or more embodiments of the invention.

FIG. 3 shows a flowchart describing a method for providing declarative content from a DCE to at least one UXP. In Step 300, application content is obtained by a DCE from an operatively connected and/or included asset content loader and content repository that stores application content. In one or more embodiments of the invention, the application content is obtained in order to initiate an application, in response to one or more user actions, and/or any other reason relevant to the execution of the DCE and/or the application being executed by a user. Specifically, the DCE transmits a request to the asset content loader. The request may include a field identifier having one or more fields. The request may further include one or more variability tags (discussed below). The DCE may obtain the variability tags from the UXP and/or detect the variability tags through interaction with the UXP. In response to the request, the asset content loader responds with application content that includes assets matching the data in the request.

In Step 302, the application content is processed by the DCE. In one or more embodiments of the invention, the application content is processed to obtain at least part of the declarative content for transmitting a view unit to a UXP. In one or more embodiments of the invention, processing the application content includes generating and/or obtaining additional content that is to be expressed as declarative content along with the application content. In such embodiments of the invention, additional content may include, but is not limited to, interaction flow and control information, data model information, data instance information, and/or user related information.

In Step 304, the application content and additional content obtained and expressed as declarative content in Step 304 is transmitted to a UXP from the DCE. In one or more embodiments of the invention, the DCE is operatively connected to at least one UXP. For example, the DCE may be executing on a server that is connected via a computer network to one or more clients on which a UXP executes. Transmission of the declarative content may include using the network functionality of the computing device on which the DCE executes in order to appropriately package the declarative content for transmission over a network.

In Step 306, a determination is made as to whether any user action has occurred. In one or more embodiments of the invention, a user action is determined to have occurred when a UXP transmits one or more user actions expressed as declarative content to the DCE. In other embodiments of the invention, the user action(s) may be expressed in any way that the DCE is capable of receiving. If a user action occurs and declarative content expressing the user action is received by the DCE, the process moves to Step 306. If no user actions occur, the process proceeds to end.

Turning to Step 308, the user action is received and processed by the DCE. In one or more embodiments of the invention, the user action(s) arrives expressed as declarative content. User actions may have occurred in response to the declarative content transmitted in Step 304 and/or for any other reason relevant to a user's use of an application. In one or more embodiments of the invention, the received user action(s) are processed by the DCE. In one or more embodiments of the invention, processing the user action(s) includes evaluating the actions in order to determine what action, if any, should be taken next by the DCE. For example, the user action may have included an input value, which is stored, and an answer to a question, which may dictate, at least in part, the interaction flow and subsequent application content to be expressed as declarative content and transmitted to the UXP. For another example, the user action may have been to switch platforms, in which case the DCE's next transmission of declarative content will be sent to the new platform. For another example, the user may desire to switch application context, such as from non-visual to visual, in which case the next transmission of declarative content from the UXP would reflect the user's preference change.

Turning to Step 310, a determination is made as to whether the user action was an error. In one or more embodiments of the invention, the UXP includes functionality to determine if the user action was created and/or was an error. In such embodiments of the invention, the declarative content received by the DCE from the UXP will include information related to one or more errors derived from a user's action(s). In other embodiments of the invention, the DCE includes functionality to determine, based on the received and processed user action information, if an error has occurred. If a user action error has occurred, the process moves to Step 312. If no user action error has occurred, then to process moves to Step 314.

Turning to Step 312, information related to an error is transmitted as declarative content to a UXP. In one or more embodiments of the invention, the DCE may obtain information related to the error, based on the user action error, and express the error information as at least part of additional declarative content. In one or more embodiments of the invention, the declarative content including the error information is transmitted to the UXP in order to be conveyed, at least in part, to the user of an application in which the error occurred. After the error information is transmitted from the DCE to the UXP, the process returns to Step 304 in order to wait for additional user action(s).

Returning to Step 314, any user input values included in the declarative content received by the DCE from the UXP are bound to dynamic content in the user data instance repository. In one or more embodiments of the invention, the user data instance repository stores, at least, a record of user input values bound to related dynamic content. The record may allow, for example, one or more UXPs to retrieve the user input information for later use by the application.

In Step 316, the DCE determines the next application content to be transmitted as a portion of a declarative content transmission. In one or more embodiments of the invention, the DCE uses, at least, the interaction module and the received user action in order to determine what application content is needed next.

In Step 318, the DCE obtains the next application content from the content repository. In one or more embodiments of the invention, the DCE requests the application content determined in Step 316 to the relevant next application content to be transmitted to the UXP. After the next application content is obtained by the DCE, the process returns to step 302, after which the next application content is processed and ultimately transmitted to a UXP as at least a portion of a next declarative content.

Figure 4:
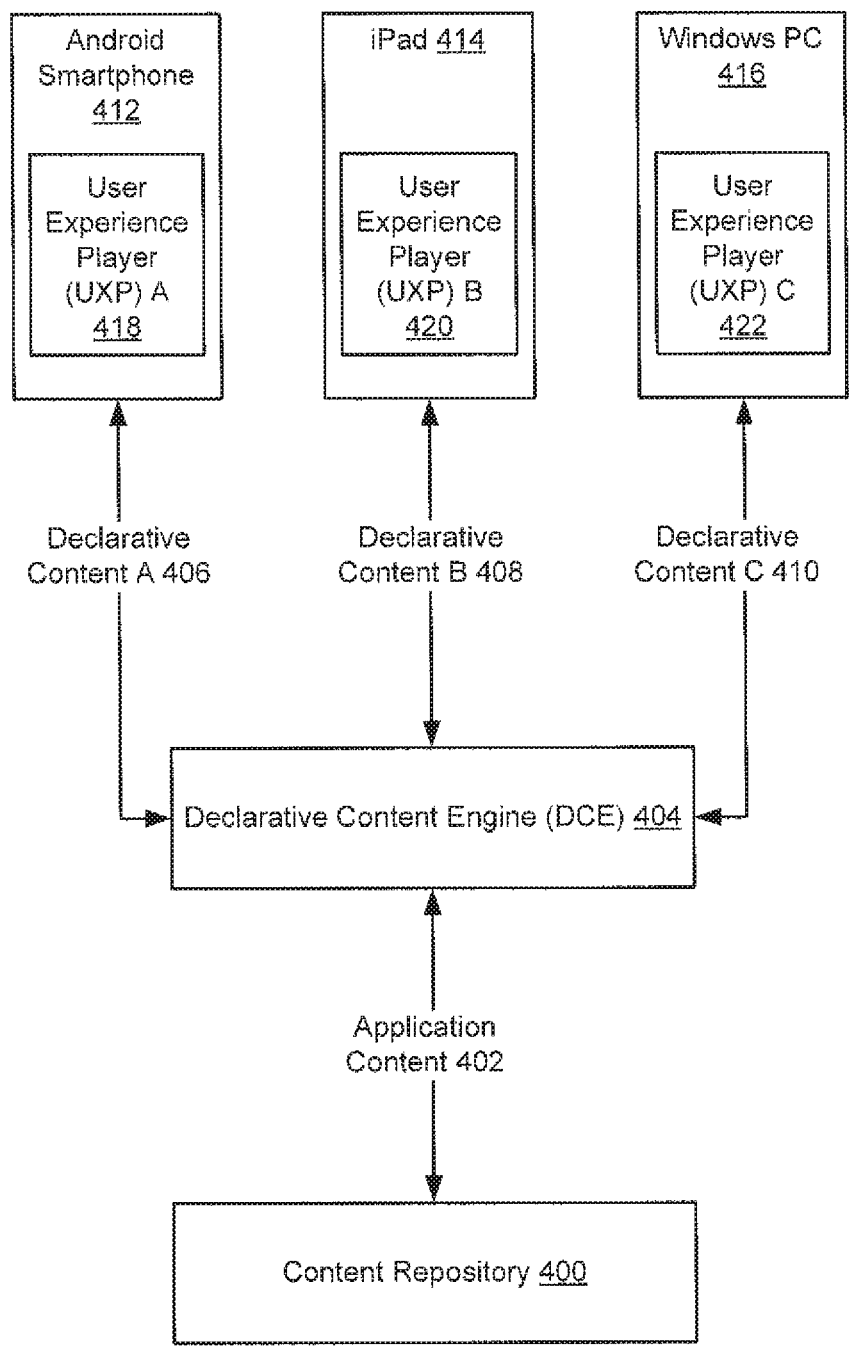
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a declarative content engine (DCE) (404) is operatively connected to a content repository (400). The DCE is also operatively connected to three platforms (i.e., three client devices). The first platform is an Android-based smartphone (412) on which UXP A (418) is executing. The second platform is an iPad (414) on which UXP B (420) is executing. The third platform is a Windows personal computer (PC) (416) on which UXP C (422) is executing. Each of the three platforms is being used by a different user (not shown) to execute a tax return preparation application, with which the UXP executes in conjunction. Between the content repository and the DCE, a conduit exists for transmitting application content (402). Although only one such conduit is shown in the example, there may be as many as necessary in order to perform aspects of the invention. The conduit may be, for example, a connection between a server and a storage device. Each of the three platforms is connected to the DCE via the Internet (not shown).

The tax return preparation application being used by each user necessarily includes a series of events in which information relevant to a tax return of a user is obtained from the user. One screen in the series of screens for obtaining information from a user of the tax return preparation application is a screen in which the user is asked what portion of the previous year the user maintained health insurance. Possible responses include: (i) "Had health insurance all year"; (ii) "Had no health insurance"; and (iii) "Had health insurance for part of the year". The question and each of the three possible answer choices are presented to each user when that user encounters the appropriate portion of the tax return preparation application. The DCE expresses this content, as well as related content, as declarative content to be transmitted to the UXP of each user's platform whenever that user requires the view unit that includes the question and answer choices.

To that end, the DCE first obtains relevant application content from the content repository. The DCE then processes the application content along with any other relevant factors in order to obtain the various pieces of declarative content to be transmitted to a UXP. The DCE may perform the action of obtaining the application data whenever one of the user's reaches the appropriate portion of the application flow.

The declarative content obtained by the DCE includes view content, which includes metadata (to indicate the type of the unit of display ("Q&A")), title (with text content), and fields (collection of multiple fields). In this example, there is a single field, with type "choice" and three "choices". View data may also include information related to binding (data field to set the value upon selection) and (actions) (navigation actions (Next and Prev) are included). The view information portion of the declarative content may be expressed as follows:

```
{ "metaData": { "type": "Q&A", "id": "ACACoverage"},
    "title": { "asset": "How long did you have health insurance in 2014?"},
    "fields": [
        { "type": "choice",
        "choices": [
            { "label": { "asset": "Had health insurance all year"},
            "value": "HadFullYearPlan" },
            { "label": { "asset": "Had no health insurance"},
            "value": "HadNoPlan" },
            { "label": { "asset": "Had health insurance part of the year"},
            "value": "HadPartYearPlan"} ],
        "binding":
"Return.ReturnData.IRS1040ScheduleACA.CoverageIndPP"
    } ],
    "actions": [
        { "label": { "asset": "Continue"},
        "value": "Next"}
        { "label": {"asset": "Back"},
"value": "Prev"} ] }
```

The declarative content obtained by the DCE also includes interaction flow and logic content, which may be expressed as follows:

```
"ACASingleFlow": {
    "startState": "VIEW_node",
    "VIEW_node": {
        "state_type": "VIEW",
        "ref": "ACACoverage",
        "transitions": {
            "Next": "END_done"
        }
    },
    "END_done": {
        "state_type": "END",
        "outcome": "doneWithFlow"
    }
}
```

The declarative content obtained by the DCE also includes data model information, which may be expressed as follows:

```
{
    "IRS1040ScheduleACAType": {
        "CoverageIndPP": {
            "type": "EnumType",
            "validation": [
                { "message": "Please select one of the options",
                "type": "required" } ],
```

```
            "enum": ["HadFullYearPlan", "HadPartYearPlan", "HadNoPlan"],
            "default": ""
        },
        "SubsidyEligibleAmtPP": {
            "type": "USAmountNNType",
            "default": ""
        } }
```

The above examples of declarative content expressions are sent to a UXP any time a user reaches the appropriate point in the application where the aforementioned question is to be asked of the user.

On the client side, a UXP executes on a user's platform (e.g., the Android smartphone (412), the iPad (414) and/or the Windows PC (416)). When the declarative content is received from the DCE by a UXP, a declarative content interpreter interprets the declarative content. Next, the UXP obtains, from one or more native rendering libraries, visual templates and navigation patterns that are specific to the platform on which the UXP executes. Content to be displayed to the user of the application (i.e., the question and the corresponding answer options) is then bound to the visual templates and navigation patterns and displayed to the user. The display of the content, as viewed by the user, may be different on each platform type. Each platform type has a different set of capabilities and functionality, therefore each user experience may differ (e.g., be optimized) for a given platform based on the platform characteristics.

For example, the Android smartphone user may see a visual representation of the application background, the question written in a first font, and each of the answer choices listed next to a circle which a user may select to select the corresponding answer choice. The iPad user's UXP receives the same declarative content as was received by the UXP of the Android smartphone in the previous example. However, the iPad user has a different user experience that includes a visual representation of the application background, the questions rendered in a second font, and three large buttons. Each of the three buttons includes one of the three answer options, requiring the user to "press" one of the three buttons using some form of cursor control mechanism (e.g., mouse, trackball, touchpad, audio control device, etc.). The Windows PC user's UXP receives the same declarative content as was received by the UXP of the Android smartphone and the iPad in the previous examples. However, the Windows PC user has a different user experience which includes a visual representation of the application background, the question being rendered in a third font, and a field for which a drop down menu exists which includes the three answer options.

In this example, the user in each case has had insurance coverage for the entirety of the previous year. Accordingly, each select the answer option indicating that insurance was maintained for the full previous year. Therefore, the UXP for each prepares a response to send to the DCE that includes the response to the question. The response is expressed as declarative content and may appear as follows:

```
{
    "IRS1040ScheduleACA": {
        "CoverageIndPP": "HadFullYearPlan",
        "SubsidyEligibleAmtPP ": "4750",
    }
}
```

This content represents a user data instance and may be bound by the DCE with dynamic content related to each user, respectively and stored in the user data instance repository.

In the above described example, three entirely different platforms, each executing a UXP, received the same declarative content from the DCE. However, the application, or portion thereof (in this case the view unit for the question regarding previous year's insurance), is rendered differently on each platform based, at least in part, on the native capabilities of the platform on which the UXP executes.

Figure 5:
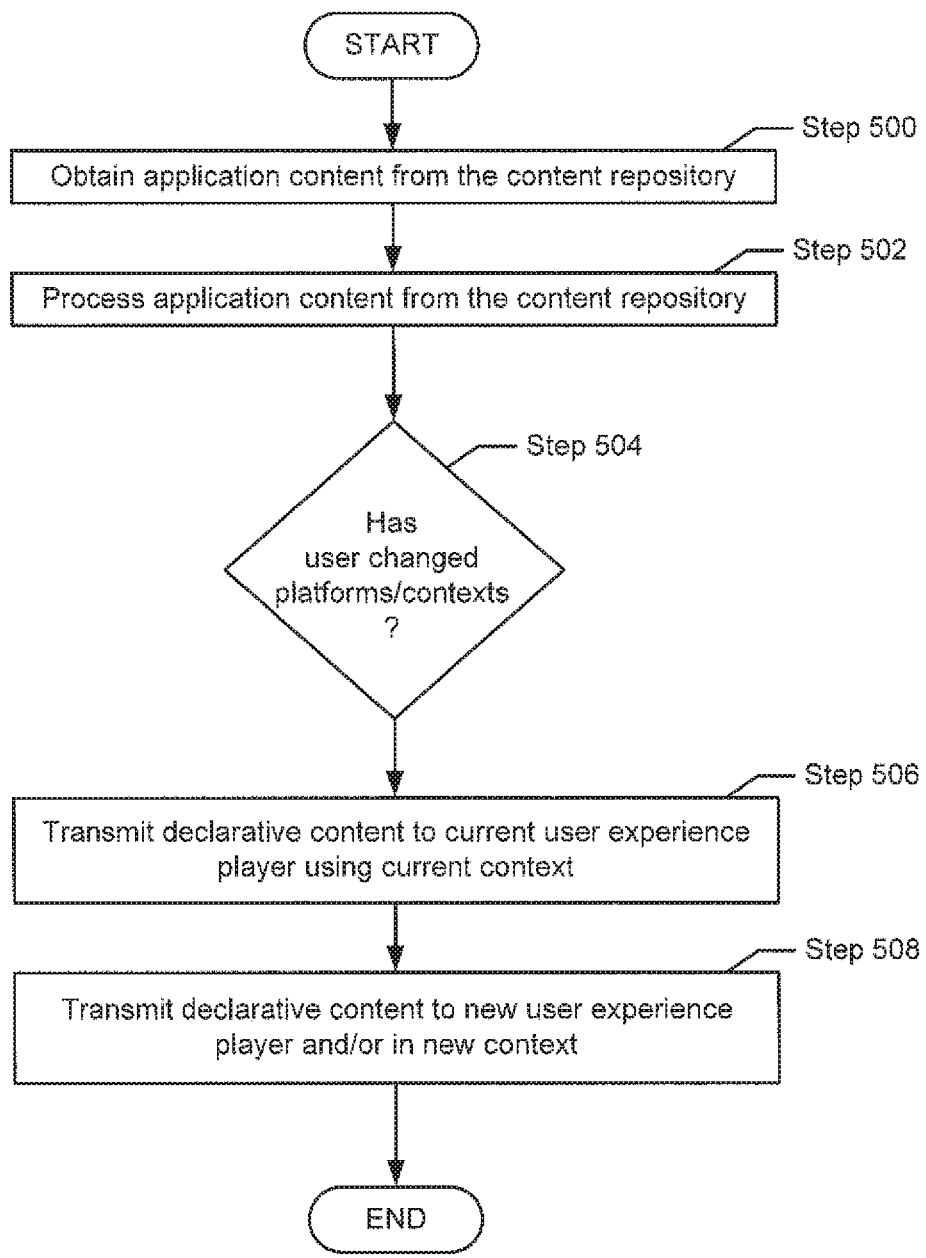
FIG. 5 shows a flowchart in accordance with one or more embodiments of the invention.

FIG. 5 is a flowchart that demonstrates an exemplary embodiment of the invention in which a user switches from a first platform while progressing through an application and/or in which a user switches from a first context to a second context. Steps 500 through 502 of FIG. 5 are substantially similar to Steps 300 through 302 of FIG. 3.

In Step 504, a determination is made as to whether a user has switched platforms and/or contexts. A user may decide to move from a first platform on which the user is executing an application to a second platform on which the user wants to execute the same application. The determination may be made explicitly, via a UXP of the first platform and/or the second platform informing the DCE of the user move. The determination may also be made implicitly, with the DCE detecting the platform change. The user may also or alternatively decide to switch contexts. For example, a user who has been interacting with the application in an audio context while driving a car may decide to switch to a visual context upon arriving at home. Determining whether a user switched context may be performed by detected or receiving a change of variability tags from the UXP. If a determination is made that a user has decided to switch platforms, contexts, and/or any combination thereof, the process moves to Step 508. If no switch has been made by the user, the process proceeds to Step 506 and the declarative content is transmitted to the current platform and/or context.

Turning to Step 508, if the user has switched platforms, then the declarative content is transmitted to a new UXP on which the user wants to continue executing the application. In one or more embodiments of the invention, the new UXP may be executing on a different platform type, and therefore the user experience changes to correspond to the new platform. If the user has additionally and/or alternatively decided to switch contexts, then the declarative content is modified to reflect the new user-desired context. In one or more embodiments of the invention, the DCE may modify (e.g., optimize) the declarative content for the new context. In such embodiments of the invention, the modification may be based, at least in part, on the platform capabilities related to the desired context.

In the exemplary embodiment of the invention described in the flowchart of FIG. 5, the determination of the change may occur after new content has been obtained and expressed as declarative content to be transmitted to a UXP. However, the invention may also include functionality to detect a change before determining and obtaining new declarative content to transmit. In such embodiments of the invention, the previously rendered content (i.e., previously presented to the user on the first platform and/or in the first context before a switch happens) is expressed as modified declarative content and transmitted to the UXP to be rendered on the new platform and/or in the new context.

In an additional exemplary embodiment of the invention, the DCE includes additional functionality to create an application shell that manages, at least in part, at least two applications executing on two separate platforms, but that are being used by the same user. In such embodiments of the invention, a user may be moving between platforms and therefore the application shell maintains the necessary data to allow each individual application to remain current in the interaction flow and with the latest user entered information as the user moves platforms. For applications such as tax preparation applications, a user may take a considerable amount of time in order to complete a given tax return. Accordingly, the application shell provides the user the capability of moving between devices. The application shell may serve as a master controller to manage the launch and switch of different UXPs, handle cross-communication between the UXPs and orchestrate user interaction among the different UXPs.

In an additional exemplary embodiment of the invention, the DCE includes additional functionality to monitor various user data such as, for example, user interaction speed, scenario complexity, network connection speed, and network connection reliability. In one or more embodiments of the invention, the DCE includes functionality to use the user information in order to predict possible future workflows, and to decide which and how much potential future content to pre-fetch to client devices on which an operatively connected UXP is executing.

Figure 6:
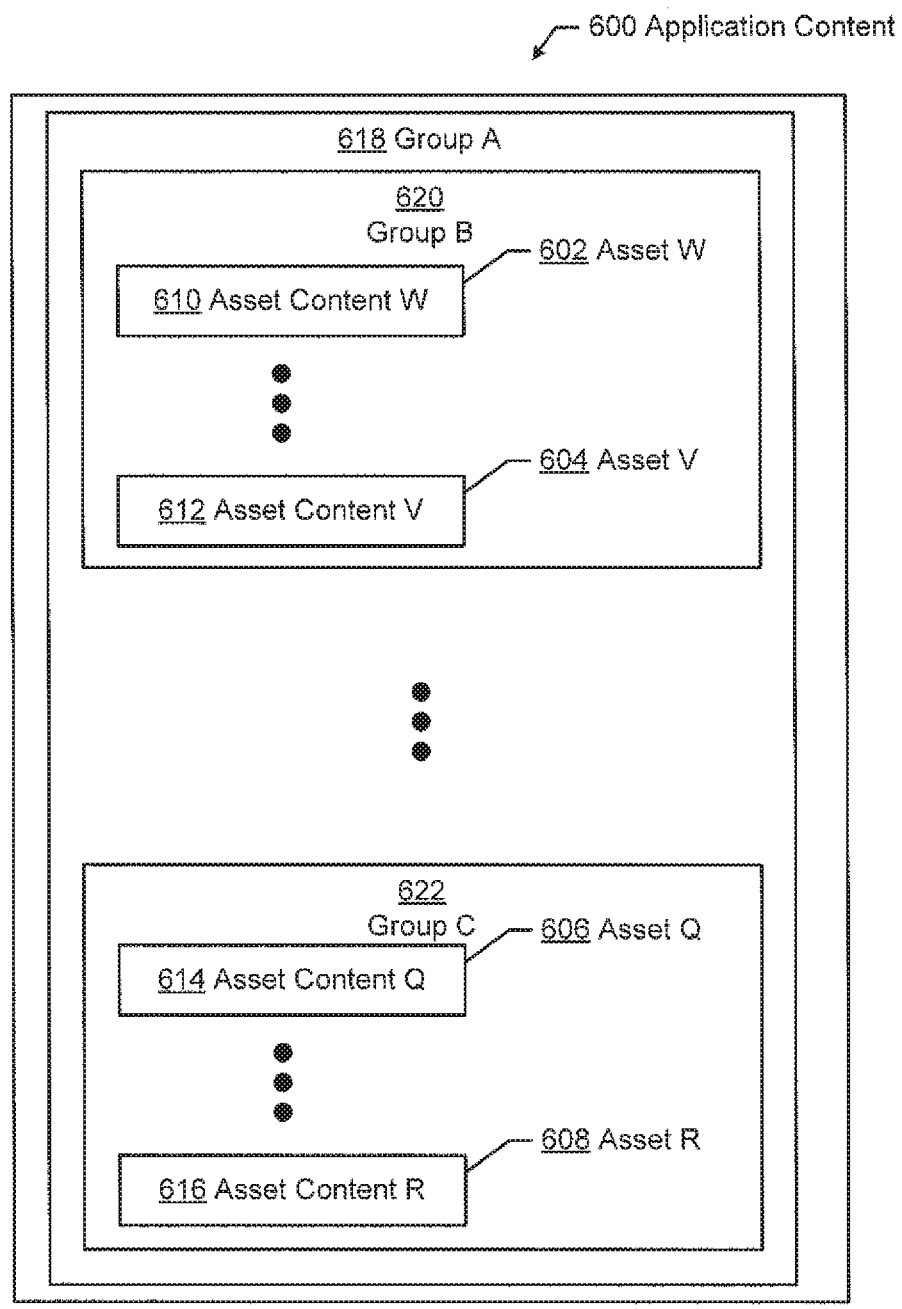
FIG. 6 shows an example diagram of application content in accordance with one or more embodiments of the invention.

FIG. 6 shows an example diagram of application content (600) in accordance with one or more embodiments of the invention. As discussed above, application content (600) may correspond to the displayed portions of an application and the function of the displayed portions with respect to the display. As shown in FIG. 6, application content (600) may be partitioned into assets (e.g., asset W (602), asset V (604), asset Q (606), asset R (608)). An asset (e.g., asset W (602), asset V (604), asset Q (606), asset R (608)) is a discrete portion of application content. In one or more embodiments of the invention, assets are indivisible. In other words, assets are not capable of being divided and retain meaning within the context of the application.

Each asset may include asset content (e.g., asset content W (610), asset content V (612), asset content Q (614), asset content R (616)). Asset content is the displayed portion of the asset. In particular, asset content may be text, image(s), or other displayed portion. For example, an asset may be for a title, a prompt, a help, an explanation of a field, or other discrete portion of application content. In the example, the asset content is the text of the title, the text prompting the user, and the explanation text.

Assets (e.g., asset W (602), asset V (604), asset Q (606), asset R (608)) may be grouped into groups (e.g., group A (618), group B (620), group C (622)). Similarly, groups may be hierarchically grouped. The grouping may be based on assets belonging to the same field, a logical grouping between fields, and a grouping between groups. As shown in the example, group A (618) includes group B (620) and group C (622). Group B (620) includes asset W (602) and asset V (604), which each includes asset content. Group C (622) includes asset Q (606) and asset R (608). The number of assets in a group as well as the amount of grouping may be variable between groups and may be configurable. In one or more embodiments of the invention, group A (618) is a root group. A root group is the group that includes all other groups in the application content and that is provided in response to a request. In particular, when a request is received, the root group is provided to the DCE as the application content. For example, a root group may correspond to a displayable page of application, sub-groups of the root group may correspond to sub-sections of the page, and assets within sub-groups may correspond to individual fields within the page.

For example, consider the scenario in which the application content is for requesting a user's administrative data. The root group may be a displayable page that has the user's administrative data. The root group may include separate sub-groups for user's name, user's home address, user's work address, and user's email. The sub-group for the user's name may include the assets for collecting a user's name. The sub-group for the user's address (e.g., home address, work address) may include separate sub-groups for house number, street, city, state, etc. The user's email sub-group may have assets to collect the user's email address.

FIGS. 7.1, 7.2, 7.3, and 7.4 show logical storage diagrams of the content repository in accordance with one or more embodiments of the invention. In the logical diagrams, the existence of a line between two components shows an existence of a logical relationship between the two components. The logical relationship may correspond to containment, a direct reference, an indirect reference, a cross-reference, or another storage mechanism for maintaining a relationship between devices.

In particular, FIG. 7.1 shows a logical diagram of a group storage structure (700) in accordance with one or more embodiments of the invention. As shown in FIG. 7.1, the group is a hierarchical tree structure or hierarchy. The root group (e.g., node G1 (702)) is the highest node in the hierarchy and may correspond to the entire application content that is transmitted in response to a single request. In some embodiments, each separate application page may correspond to a separate hierarchy. Alternatively or additionally, application content which is intended to be transmitted together in response to a single request corresponds to an individual hierarchy. The root group (e.g., node G1 (702)) may optionally have one or more children groups (e.g., node G2 (704), node GN (706)). In other words, a parent child relationship between groups indicates that a child group is a sub-group of the parent group. A group may have any number of children sub-groups. Further, the depth or number of groups between the root group and a leaf node may vary. Leaf nodes (e.g., node A1 (708), node A2 (710)) of the group storage structure (700) correspond to assets. In other words, an asset does not have a child group. Rather, an asset has a parent group.

FIG. 7.2, shows a schematic diagram of a group entry (720) in the content repository. A group entry is a storage entry for a group in the content repository. In other words, the group entry may include data about a group, which is referred to as a current group below. The group entry may include a parent group identifier (ID) (722), a current group identifier (724), one or more variability tags (726), and one or more children identifiers (728). In general, an identifier is a unique identifier of a group or asset in the content repository. For example, the identifier may be alphanumeric, binary, symbolic, or a combination thereof identification of the asset or the group. Thus, the parent group ID (722) is the identifier of the parent of the current group. The current group ID (724) is the identifier for the current group. The child identifiers (728) are an identifier of one or more children. In other words, the child identifiers may be group identifiers for sub-groups of the current group or asset identifiers of assets in the current group.

In one or more embodiments of the invention, a variability tag (726) is a description of the application context for which the current group is designed. In other words, the variability tag defines the context of the application in which the assets in the group should be used. For example, the variability tags may include, but are not limited to, identification of platform type (e.g., mobile, desktop, web browser, etc.), form factor (e.g., small, medium, large, etc.), device capabilities (e.g., camera, available sensors, location sensing, etc.), language preferences (e.g., English, Spanish, etc.), user profile information (e.g., profession, age, demographics, etc.), user emotional state, complexity of user scenario, edition of application (e.g., stock keeping unit (SKU), student, professional, home) and/or any combination thereof.

A variability tag may also define a test case for the asset. In particular, the variability tag may include a test case identifier. The test case identifier is an identifier of a particular test case. In other words, multiple groups and/or assets may have the same tags and properties and have different test case identifiers. By way of a more concrete example, consider the scenario in which an application designer would like to test how a user interprets text of "Please enter your listed income from W-2" as compared to "My wages, tips, and other compensation listed on my W-2 is:". In the example, the application designer may create a first asset with variability tag "test case A" and asset content, "Please enter your listed income from W-2," and create a second asset with variability tag "test case B" and asset content, "My wages, tips, and other compensation listed on my W-2 is:". The remaining parts of the group and/or assets may be the same or substantially the same.

FIG. 7.3 shows a schematic diagram of an asset entry in the content repository (740) in accordance with one or more embodiments of the invention. As shown in FIG. 7.3, the asset entry (740) may include a parent group ID (742), an asset ID (744), a field ID (746), one or more asset property values (748), one or more variability tag(s) (750), and asset content (752) in accordance with one or more embodiments of the invention. The parent group ID (742), asset ID (744), and variability tag(s) (750) may be the same or similar to the identifiers and variability tags discussed above with reference to FIG. 7.2.

In one or more embodiments of the invention, although FIGS. 7.2 and 7.3 show the group entry and the asset entry as each including cross references to parent entry and child entries, the referencing may be single directional or may be based on another data structure for maintaining relationships. For example, only the child asset or group may include a reference to the parent group, or only the parent may include a reference to the child or children asset or group. By way of another example, the referencing may be based on containment of the child in the parent.

Continuing with FIG. 7.3, the field identifier (746) is a unique identifier of a field. For example, the field identifier may be alphanumeric, symbolic, a binary identifier, or a combination thereof of the field. By way of another example, the field identifier may be a binding to a location in a form. For example, if the application is designed to populate a form that is to be filed, the field identifier may be a name of the form and an identifier of a user input field on the form. By way of another example, the field identifier may be a unique identifier of a data structure and to entry in that data structure, which is generated by the application. Other unique identifiers may be used without departing from the scope of the invention.

In one or more embodiments of the invention, asset property values are values of the asset that define the function of the asset within the application and with respect to the field. For example, an asset property value may be prompt, help, informational, option, category, title, or other semantic value.

A prompt is a statement, question, or phrase that is presented to a user to request particular user data. For example, a prompt may be "Are you married?", "Do you have insurance?", "My insurance carrier is:", "First Name:", or an indication that the user is to provide information.

A help is additional information that may be provided to the user to assist the user in answering the request. For example, help may be an identification of a location in which a user may find the requested data, whether certain data should be included in requested data, the format type of the answer, and any other information that provides assistance in submitting the response to the request in the prompt.

Informational are facts and/or suggestion that are presented to the user. For example, informational may be "Too bad that you do not have insurance, you will have to pay a penalty," "The current federal interest rate is 2%," "Did you know that snow geese migrate more than 3000 miles?", or other information.

An option is a selectable answer that may be selected by a user. For example, an option may be a state in the United States, a range of incomes, or other selectable answers. Option may have specified intrinsic values, such as true and false, a number indicating a position of the particular option in a set of options, or another value.

A category is a classification of the field to be presented to the user. A title is a heading that is to be displayed with the field. For example, the title may be the title of the form and the category may be a subheading in the form.

In one or more embodiments of the invention, assets that have the same field ID and asset property values are alternatives of each other, regardless of which group includes the asset. In other words, if two assets have the same field ID and have the same asset property values, then only one of the two assets is presented to the user for the particular context. Namely, if two assets are defined for collecting the same data and presenting the same subject matter to a user, then the two assets have the same field ID and asset property values and different variability tags. For example, one asset may be for large screen sizes while another asset may be for small screen sizes. In the example, the first asset may have longer text (e.g., more words) than the second asset that has shorter text. By way of another example, one asset may be in complicated English for English speakers that are using a professional edition of the application while another asset in Portuguese is for Portuguese speakers, regardless of the edition of the application.

In one or more embodiments of the invention, assets that have the same field ID and different asset property values are complements to each other and are to be transmitted and displayed together. By way of an example, a single field ID may be related to a first asset that has an asset property value of option, a second asset that has a third asset property value of prompt, a fourth asset that has an asset property value of help, a fifth asset that has an asset property value of title. Each of the five assets may be in a same group indicating that each of the five assets should be transmitted together as application content for the field in accordance with one or more embodiments of the invention.

In one or more embodiments of the invention, groups that have assets including the same field ID are alternatives of each other. For example, if a first group and a second group both have at least one asset with the same field ID, then the first group is an alternative of the second group regardless of the number of assets in the first group or the second group or whether one or more other different field IDs are in the groups. Conversely, in one or more embodiments of the invention, sub-groups of a same group, whose assets are entirely different field IDs are complements of each other and are transmitted together as application content.

The above are example embodiments of differentiating between alternative presentations and additional presentations. Other mechanisms that do not require commonality of field ID and/or asset property values may be used without departing from the scope of the invention.

FIG. 8 shows an example relational diagram (800) of assets and groups in accordance with one or more embodiments of the invention. Specifically, FIG. 8 shows an example logical diagram of the content repository for storing application content directed to collecting a user's name. The example in FIG. 8 is for explanatory and example purposes only and not intended to limit the scope of the invention. Rather, FIG. 8 shows one of many mechanisms for storing different requests for a user's name that are within the scope of embodiments of the invention.

FIG. 8 shows three root groups, G1 (802), G4 (804), and G5 (806). Below is an outline of the assets in G1 (802), G4 (804), and G5 (806). Reference numbers next to the assets correspond to reference numbers in FIG. 8.

1. Group ID G1 (802) (Name)
    a. Group ID G2 (808) (First Name):
    i. Variability Tags: Large/English
    ii. Asset ID A1 (810):
        1. Variability Tags: Large/Student edition/English
        2. Field Identifier: First Name
        3. Asset Content: Please enter your first name
        4. Asset Property: Prompt
    iii. Asset ID A2 (812):
        1. Variability Tags: Large/English
        2. Field Identifier: First Name
        3. Asset Content: Enter First Name Here:
        4. Asset Property: Prompt
    iv. Asset ID A3 (814):
        1. Variability Tags: Large/English
        2. Field Identifier: First Name
        3. Asset Content: This is your legal first name
        4. Asset Property Help
    b. Group ID G3 (816) (Last Name):
    i. Variability Tags: Large/English
    ii. Asset ID A4 (818):
        1. Variability Tags: Large/Student edition/English
        2. Field Identifier: Last Name
        3. Asset Content: Please enter your Last name
        4. Asset Property: Prompt
    iii. Asset ID A5 (820):
        1. Variability Tags: Large/English
        2. Field Identifier: First Name
        3. Asset Content: This is your legal last name
        4. Asset Property: Help
2. Group ID G4 (804) (First Name):
    a. Variability Tags: Small/English
    b. Asset ID A6 (822):
    i. Variability Tags: Small/English
    ii. Field Identifier: First Name
    iii. Asset Content: First name:
    iv. Asset Property: Prompt
    c. Asset ID A7 (824):
    i. Variability Tags: Small/English
    ii. Field Identifier: First Name
    iii. Asset Content: This is your legal first name
    iv. Asset Property: Help 3. Group ID G5 (806) (Last Name):
   a. Variability Tags: Small/English
   b. Asset ID A8 (826):
      i. Variability Tags: Small/English
      ii. Field Identifier: Last Name
      iii. Asset Content: Last name:
      iv. Asset Property: Prompt
   c. Asset ID A9 (828):
      i. Variability Tags: Small/English
      ii. Field Identifier: Last Name
      iii. Asset Content: This is your legal last name
      iv. Asset Property: Help In the above example and as shown in FIG. 8, G1 (802) includes group G2 (808) for requesting the first name and group G3 (816) for requesting the last name. Group G2 (808) has asset A1 (810), asset A2 (812), and asset A3 (814). Asset A1 (810) and asset A2 (812) are alternatives of each other. In other words, asset A1 (810) and asset A2 (812) are both prompts with a field identifier of first name. Asset A1 (810) is defined for large format, a student edition of an application, and English. Asset A2 (812) is for large format and English. In other words, asset A2 (812) is a default format for English speakers to display on large screens. Asset A3 (814) is a help that may be combined with asset A1 (810) or A2 (812).

Group G3 (816) has asset A4 (818) and asset A5 (820). Asset A4 (818) is a prompt. Asset A5 (820) is a help that complements the prompt of asset A4 (818). In one or more embodiments of the invention, when the content asset loader transmits the application content and selects group G1 for transmission, the content asset loader may transmit select A1 (810) or asset A2 (812) and transmit the selected asset along with the remainder of the tree.

Continuing with the example, group G4 (804) and group G5 (806) are alternatives to group G1 (802) for smaller screen sizes. In other words, rather than combining the first name and last name into a single application content to display on a single page, the first name request may be presented on one page and the last name request may be presented on a second page. In other words, group G4 (804) for requesting the first name has asset A6 (822) and asset A7 (824). Asset A6 (822) is a prompt requesting the first name. Asset A7 (824) is a help that complements the prompt of asset A6 (822). Further, group G5 (806) for requesting the last name has asset A8 (826) and asset A9 (828). Asset A8 (826) is a prompt requesting the last name. Asset A9 (828) is a help that complements the prompt of asset A8 (826).

In the example, if a computing device requests a first name field and is in the large form factor, then group G1 (802) may be transmitted as the application content with the first name and last name fields. As another example, if a computing device requests the first name field and is in the small form factor, then group G4 (804) may be transmitted instead of group G1 (802) as the application content. The computing device may then separately request the last name field.

Returning to the content repository, in order to select groups and/or assets, scores may be used in one or more embodiments of the invention. The content repository may also store a configurable scoring mechanism for scoring variability tags. In one or more embodiments of the invention, the scoring may define which asset takes precedence in the case of a conflict in which at least two assets have matching variability tags to the request. FIG. 7.4 shows an example variability tag entry (760) for maintaining the scores for variability tags. As shown in FIG. 7.4, each variability tag entry (760) may include a variability tag type (762), a variability tag (764), and a score (766). The variability tag type (762) is the type or category of the variability tag. For example, the variability tag type may be language, application edition, geographic location, or other class of the variability tag. The variability tag (764) is the value of the variability tag, such as English, German, Cantonese, South Africa, Europe, Professional, Student, etc. The variability tag score (766) is the configurable score assigned to the variability tag. The score may be on virtually any scale and may be end user, learned through machine learning, and/or developer defined. Although FIG. 7.4 shows the score being defined at the granularity of the variability tag, the score may be defined at the granularity of the variability tag type. In such a scenario, the variability tag entry may omit the variability tag.

Figure 9:
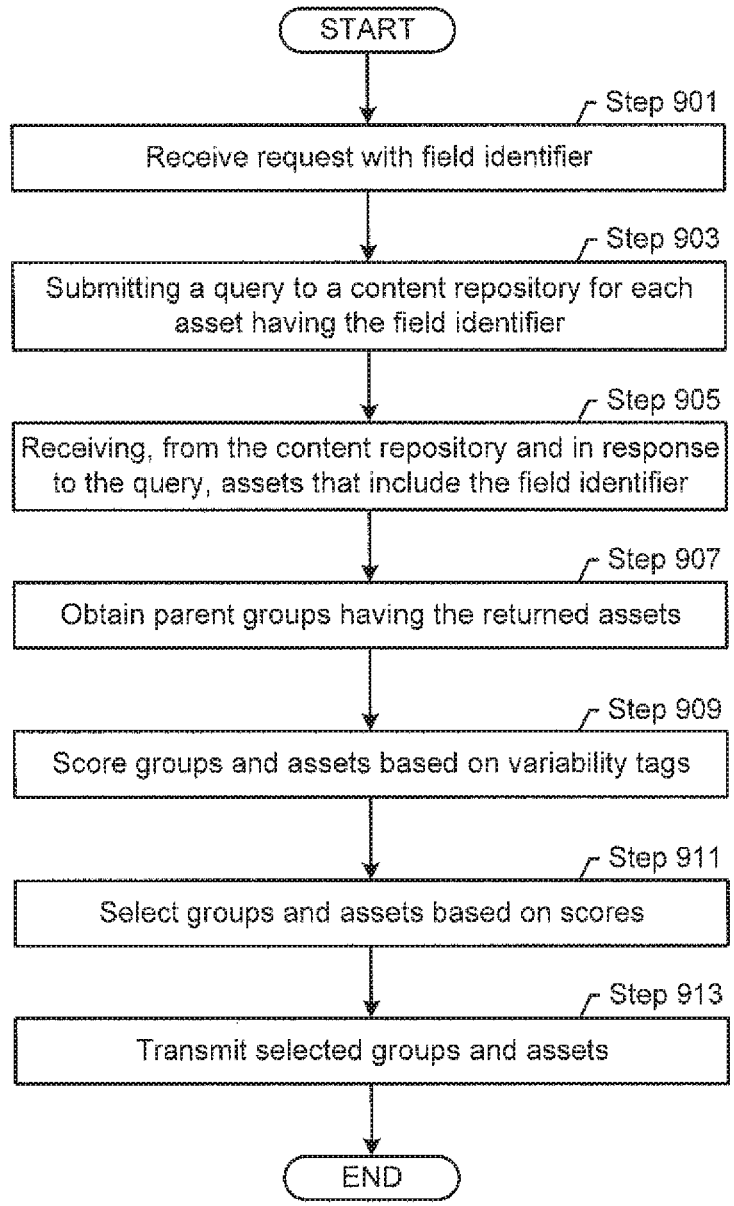
FIGS. 9-11 show flowcharts in accordance with one or more embodiments of the invention.
Figure 10:
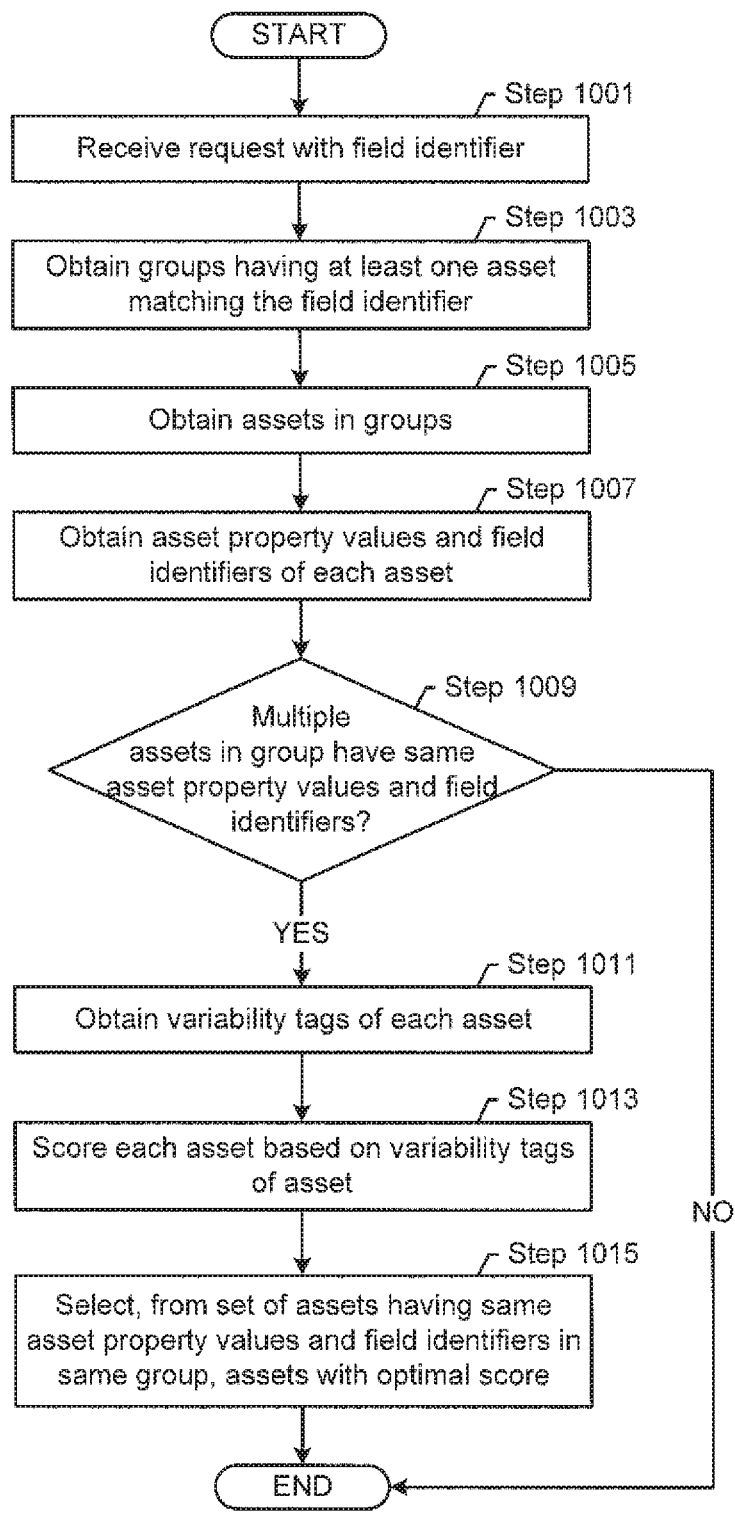
Figure 11:
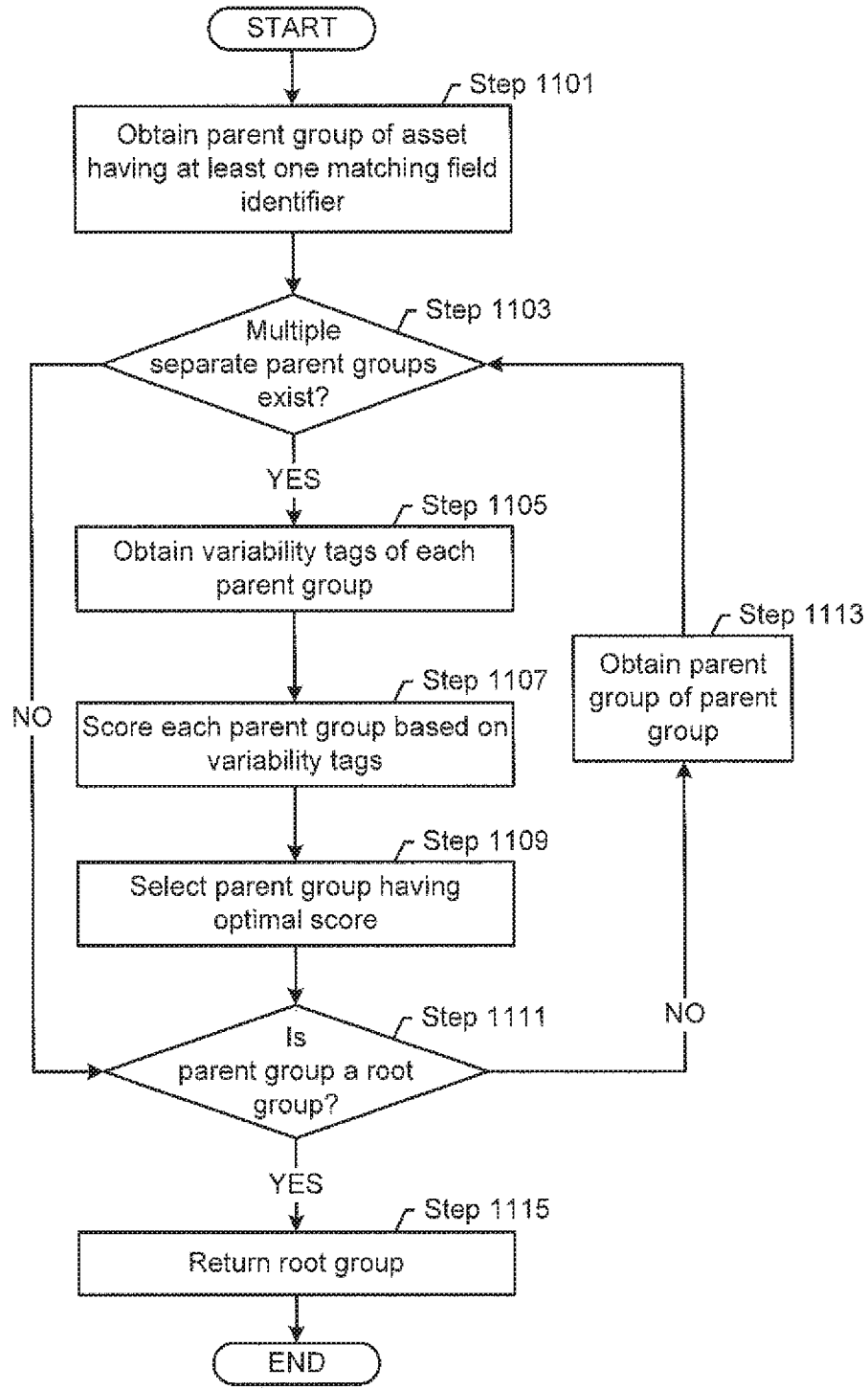

FIGS. 9-11 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

FIG. 9 shows a flowchart for responding to a request for application data in accordance with one or more embodiments of the invention. In Step 901, a request with a field identifier is received in accordance with one or more embodiments of the invention. For example, the DCE or a component on the DCE may transmit the request to the content asset loader. When the DCE or other component transmits the request, the component may include the field identifier and any variability tags of the UXP. Specifically, the DCE may select and transmit a field identifier of a highest priority and an incomplete field. With the field identifier, the DCE may collect and transmit one or more variability tags describing the context of the UXP. The variability tags may be obtained from the UXP in the request from the UXP for the next application data, detected by the DCE when interacting with the UXP, through other actions, or through any combination thereof. The request may be received as a procedure call, a message, or other mechanism for communication.

In Step 903, a query is submitted to the content repository for each asset having the field identifier in accordance with one or more embodiments of the invention. In particular, the content asset loader sends a query to the content repository for any assets that include the requested field identifier. The content repository searches through the assets to find matching assets. The search may be performed using an index.

In Step 905, in response to the request, assets that include the field identifier are received from the content repository in accordance with one or more embodiments of the invention. In particular, the content repository may respond with the hierarchical structure of each hierarchy that includes an asset having the field identifier. The hierarchical structure provided by the content repository includes root groups, parent groups, assets, and the relationships between the groups/assets.

In Step 907, parent groups having the returned assets are obtained in accordance with one or more embodiments of the invention. In one or more embodiments of the invention, the content asset loader obtains the parent groups of each group having an asset matching the field identifier from the returned hierarchy.

In Step 909, groups and assets are scored based on variability tags in accordance with one or more embodiments of the invention. Different mechanisms may be performed for scoring groups and assets. For example, in some embodiments, all groups and assets are scored. In other embodiments, only alternative groups and assets are scored. The scoring may be performed by matching the variability tags in the returned hierarchy with the variability tags in the content repository, and obtaining the corresponding scores of the matching variability tags from the content repository. A mathematical combination of the corresponding scores may be calculated to obtain a score for each asset and/or group.

In Step 911, groups and assets are selected based on scores in accordance with one or more embodiments of the invention. In one or more embodiments of the invention, the selection is based on the optimal score. For example, if the highest score is the optimal score, then an alternative asset/group having the highest score is selected from a set of alternative assets/groups. If the lowest score is the optimal score, then an alternative asset/group having the lowest score is selected from a set of alternative assets/groups. Assets and/or groups that are not conflicting or not alternatives of each other are selected. In some embodiments, selecting a group or asset may correspond to maintaining a data structure having the asset ID or group ID of the selected groups or assets. Other mechanisms for tracking which assets are selected may be used without departing from the scope of the invention.

In Step 913, the selected groups and assets are transmitted in accordance with one or more embodiments of the invention. In one or more embodiments of the invention, the hierarchy having the root group with selected groups and assets is transmitted back to the requesting application. Not selected assets or groups may be pruned from the hierarchy. The hierarchy is transmitted as application content to the DCE or a component of the DCE. After being transmitted, the DCE may modify the application content to declarative content and transmit the declarative content to the DCE.

As shown above, one or more embodiments of the invention bifurcate the optimization of an application for a particular computing device. In particular, the content repository and the asset content loader tailor the amount and content of the data displayed on the particular computing device, while the UXP on the particular computing device formats the application and data for the particular computing device to take advantage of the hardware of the device.

FIGS. 10 and 11 show a more detailed flowchart for selecting groups and assets to respond to a request in accordance with one or more embodiments of the invention. Specifically, FIG. 10 shows a flowchart for selecting assets in accordance with one or more embodiments of the invention. In Step 1001, a request with a field identifier is received in accordance with one or more embodiments of the invention. The request may be received in a same or similar manner as discussed above with reference to Step 901 of FIG. 9.

In Step 1003, groups having at least one asset matching the field identifier are obtained in accordance with one or more embodiments of the invention. For example, the asset content loader may submit a query to the content repository with the requested field identifier. The content repository may respond with each hierarchy having an asset with the field identifier. Alternatively, the content repository may respond with only the immediate parent group of each asset.

In Step 1005, assets in the groups are obtained in accordance with one or more embodiments of the invention. In particular, assets in each group are identified. The assets in the group are identified regardless of whether the assets match the field identifier transmitted in the original request.

In Step 1007, the asset property values and field identifiers of each asset are obtained in accordance with one or more embodiments of the invention. For each asset, the asset content loader obtains the asset property values and the field identifiers to determine whether the asset is an alternative asset to a previously examined asset.

In Step 1009, a determination is made whether multiple assets in the group have the same asset property values and field identifiers in accordance with one or more embodiments of the invention. The determination is made with respect to each asset and each field identifier, regardless of whether the field identifier is in the original request in accordance with one or more embodiments of the invention. If multiple assets do not have the same asset property values and field identifiers, then all assets in the group are selected and the flow may proceed to end. Alternatively, if multiple assets have the same field identifier and the same asset property values, then the multiple assets are alternatives. Thus, if at least two assets have the same asset property values and field identifiers, then the flow may proceed to Step 1011 in accordance with one or more embodiments of the invention.

In Step 1011, variability tags of each asset are obtained in accordance with one or more embodiments of the invention. In particular, for each asset that has the same field identifier and the same asset property values, the variability tags of the asset are obtained. Obtaining the variability tags may be performed, for example, by receiving the variability tags from the data repository and/or extracting the variability tags from the asset.

In Step 1013, each asset is scored based on the variability tags of the asset in accordance with one or more embodiments of the invention. The scoring may be performed as discussed above with reference to Step 909 in FIG. 9. Various scoring systems may be used. In one or more embodiments of the invention, regardless of the scoring system used, the scoring system is consistently applied to each asset that is compared in order to obtain a score for the asset. The following are some examples of scoring systems. Other scoring systems may be used without departing from the scope of the invention. In at least some embodiments, the mathematical calculation is a summation of the score of each matching variability tag in the request and the asset. The summation may be reduced by variability tags that do not match. For example, if the asset has any additional variability tags that are not in the request, the score may be reduced by the score in the content repository of the additional variability tags. Additionally or alternatively, in some embodiments, if the request has any additional variability tags that are not in the asset, the score may be reduced by the score in the content repository of the additional variability tags.

The following is an example of scoring in accordance with one or more embodiments of the invention. In the following example, consider the scenario in which the request has variability tags: English Language, Professional Edition, and Large Form Factor. Further, in the example, Asset X has variability tags: English Language, Student Edition, Small Form Factor, and Alpha Test Case. The content repository has the following score assignments: English Language has score 500, Professional Edition has score 60, Student Edition has score 60, Small Form Factor has score 30, Large Form Factor has score 25, and Alpha Test Case has score 8. In the example, Asset X matches in the English Language. Thus, Asset X may be assigned a score of 500. If the score is reduced, the score may be reduced by 60 and 25 for not having the form factor or edition variability tags that are in the request, resulting in a total score of 415. The score may additionally or alternatively be reduced by 60, 30, and 8 for having an edition, form factor, and test case that is not in the request resulting in a total score of 317 (i.e., 415−60−30−8=317) or 402 (i.e., 500−60−30−8=317). Alternative assets are similarly scored to obtain matching scores for each asset.

In Step 1015, from the set of assets having the same asset property values and field identifiers in the same group, assets with the optimal score are selected in accordance with one or more embodiments of the invention. Selecting assets with optimal scores may be performed as discussed above with respect to Step 911 of FIG. 9. Specifically, from a set of alternative assets, the assets with the optimal scores are selected. Assets that are not alternatives of each other and are in the same group may also be selected.

In one or more embodiments of the invention, after selecting the assets, groups may also be selected amongst possible conflicting groups. For example, one group may be for large form factor or professional edition, while another group having fewer assets is for small form factor or home edition. FIG. 11 shows a flowchart for selecting groups in accordance with one or more embodiments of the invention. In Step 1101, parent group(s) of an asset having at least one matching field identifier is obtained in accordance with one or more embodiments of the invention. The parent groups may be in the same hierarchy or in different hierarchies. Obtaining the parent group may correspond to identifying the parent group through a reference from the parent group to the asset or from the asset to the parent group.

In Step 1103, a determination whether multiple separate parent groups exist in accordance with one or more embodiments of the invention. If multiple separate parent groups exist, then the multiple separate parent groups are alternatives of each other. If multiple separate parent groups do not exist, the flow may proceed to Step 1115 (discussed below).

If multiple separate parent groups exist, then the flow proceeds to Step 1105. In Step 1105, variability tags of each parent group are obtained in accordance with one or more embodiments of the invention. In particular, for each group that has an asset with the same field identifier, the variability tags of the group are obtained. Obtaining the variability tags may be performed, for example, by receiving the variability tags from the data repository and/or extracting the variability tags from the group.

In Step 1107, each parent group is scored based on the variability tags in accordance with one or more embodiments of the invention. Scoring the parent group may be performed in a same or similar manner as discussed above with reference to Step 1013 in accordance with one or more embodiments of the invention. In some embodiments, the same scoring system is used for scoring assets as for scoring groups. In other embodiments, different scoring systems are used. Despite which scoring system is used, the used scoring system is consistently applied across the compared groups.

In Step 1109, the parent group having the optimal score is selected in accordance with one or more embodiments of the invention. Selecting the parent group may be performed as discussed above with reference to Step 911 of FIG. 9.

In some embodiments, different groups in the same hierarchy are not alternatives of each other. In other words, the entire hierarchy of groups, with the exception of some non-selected assets is transmitted as application content to the DCE. In other embodiments, different groups in the same hierarchy may be alternatives of each other. In such embodiments, an additional step may be performed to identify alternatives by determining whether the same field identifier is in multiple groups in the same hierarchy, regardless of whether the field identifier is in a request. If a same field identifier is in the same hierarchy and is in different groups, the scoring mechanism and selection mechanism may be performed as discussed above, with the exception that the selection ensures the field identifier in the request is in the final selected hierarchy.

Continuing with FIG. 11, in Step 1111, a determination is made whether the parent group is a root group in accordance with one or more embodiments of the invention. As discussed above, a parent group is a root group when the parent group does not have a parent. Determining whether the parent group is a root group may be performed by determining whether any group references the parent group as a child or determining whether the parent group references another group as a parent. Other mechanisms for determining whether a group is a parent group may be used without departing from the scope of the invention.

If the parent group is not a root group, in Step 1113, the parent group of the parent group is obtained in accordance with one or more embodiments of the invention. In other words, the current group's parent from the hierarchy is processed. Obtaining the parent group may correspond to identifying the parent group through a reference from the parent group to the current group or from the current group to the parent group. By following the reference, the parent group may be obtained.

If the parent group is a root group, in Step 1115, the root group is returned in accordance with one or more embodiments of the invention. In other words, the hierarchy is transmitted along with any selected groups and assets. Assets or groups that are not selected may be omitted from the hierarchy returned to the DCE. Transmitting the hierarchy may be performed as discussed above with reference to Step 913 of FIG. 9.

FIGS. 12 and 13 show an example in accordance with one or more embodiments of the invention. The following example is for explanatory purposes only and not intended to limit the scope of the invention. FIG. 12 shows an example populated user interface at the UXP. Specifically, FIG. 12 shows a populated template that is presented to a user. As shown in FIG. 12, the template includes spaces for a topic context (1202), category title (1204), explanation (1206), prompt description (1208), graphical user interface (GUI) field (1210), an affirmative description (1212), a negative description (1214). The template also includes a forward navigation button (1216) and a backward navigation button (1218). The text in the template is from the content repository. Formatting, buttons, and GUI fields are defined by the UXP as part of the selected template in accordance with one or more embodiments of the invention.

The topic context (1202) is a place for storing the context of the question presented in the user interface. The category title (1204) provides the overall category of the question. The explanation (1206) provides background material that may assist a user in answering the question. The prompt description (1208) or prompt is the question that is presented to the user. The GUI fields (1210) are selectable buttons that allow the user to answer the question. The affirmative description (1212) informs the user as to the meaning behind a yes answer while the negative description (1214) provides the meaning of a no answer. Navigation buttons allow the user to move forward or backward through the application.

In order to create the example user interface shown in FIG. 12, the content repository stores text for FIG. 12. FIG. 13 shows example contents of the content repository (1300) to generate the user interface shown in FIG. 12. As shown in FIG. 13, the content repository may be separated into at least three data structures. A first data structure may be a description data structure (1302) that has assets providing a description of the various parts of a corresponding field. Each row in the description data structure (1302) is a separate asset or group. Columns in the description data structure may correspond to ID (1304), asset property values (1306), variability tags (1308), and asset content (1310). The ID (1304) is the unique identifier of the asset. The asset property values (1306) include the field or group identifier to which the asset relates and the type or function of the asset in the field or group. The variability tags (1308) include the form factor, language (i.e., "en" for English), and SKU. The asset content (1310) includes a description, which is the text and the font of the text in the asset content.

The second data structure may be an option data structure (1312). Each row in the option data structure (1312) is a separate asset that corresponds to an option that may be selected. Columns in the description data structure may correspond to ID (1314), asset property values (1316), variability tags (1318), and asset content (1320). The ID (1314) is the unique identifier of the asset. The asset property values (1316) include the field identifier to which the asset relates and whether the option corresponding to the asset is defined as true or false. The variability tags (1318) include the form factor, language (i.e., "en" for English), and SKU. The asset content (1320) includes a description, which is the text describing the meaning of the respective answers.

A third data structure may be a relational data structure (1322) that relates the parent group to the child field ID and provides a topic for the overall data structure. In other words, the third data structure may define the hierarchy.

FIG. 13 shows only one example of data structures for the content repository. Other mechanisms for storing the data and data structures may be used without departing from the scope of the invention.

Figure 14:
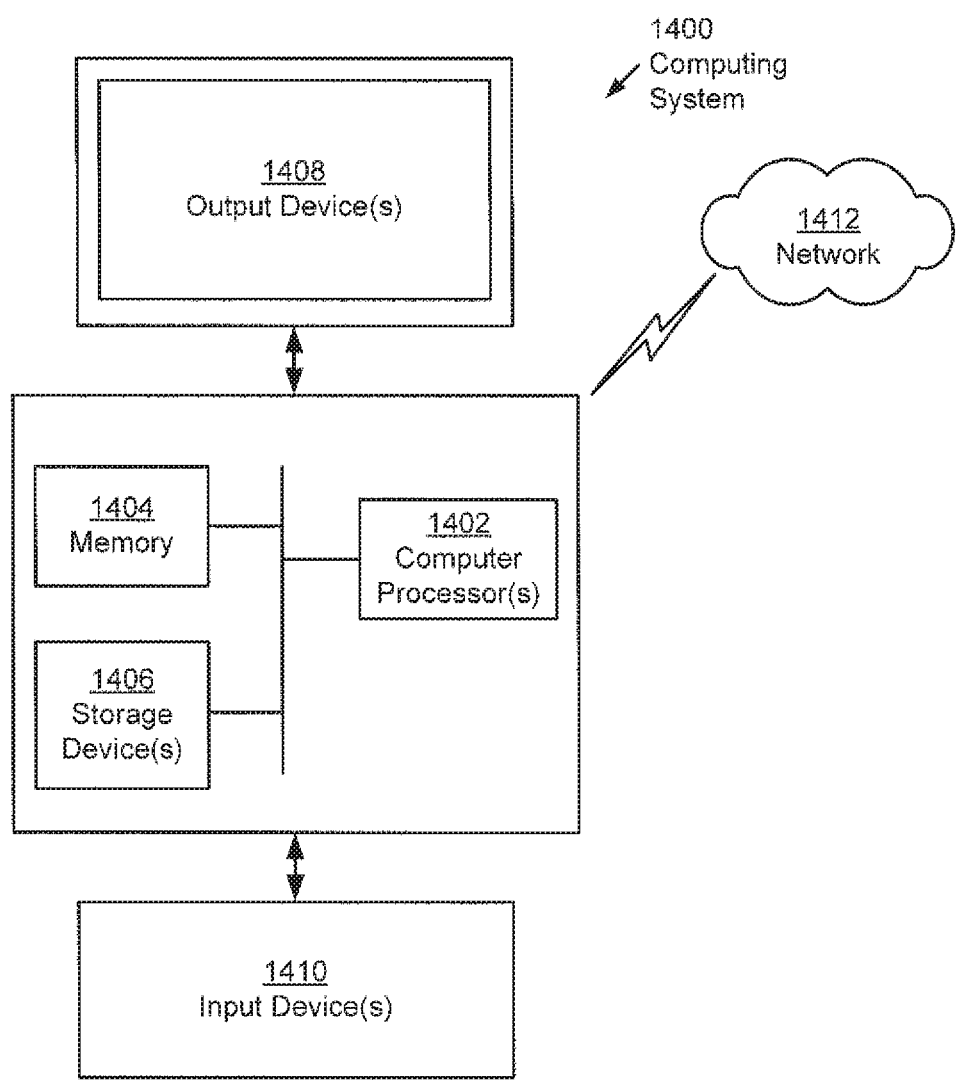
FIG. 14 shows a computing system in accordance with one or more embodiments of the invention.

Embodiments of the invention may be implemented on a computing system. Any combination of mobile, desktop, server, embedded, or other types of hardware may be used. For example, as shown in FIG. 14, the computing system (1400) may include one or more computer processor(s) (1402), associated memory (1404) (e.g., random access memory (RAM), cache memory, flash memory, etc.), one or more storage device(s) (1406) (e.g., a hard disk, an optical drive such as a compact disk (CD) drive or digital versatile disk (DVD) drive, a flash memory stick, etc.), and numerous other elements and functionalities. The computer processor(s) (1402) may be an integrated circuit for processing instructions. For example, the computer processor(s) may be one or more cores, or micro-cores of a processor. The computing system (1400) may also include one or more input device(s) (1410), such as a touchscreen, keyboard, mouse, microphone, touchpad, electronic pen, or any other type of input device. Further, the computing system (1400) may include one or more output device(s) (1408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1400) may be connected to a network (1412) (e.g., a local area network (LAN), a wide area network (WAN) such as the Internet, mobile network, or any other type of network) via a network interface connection (not shown). The input and output device(s) may be locally or remotely (e.g., via the network (1412)) connected to the computer processor(s) (1402), memory (1404), and storage device(s) (1406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (1400) may be located at a remote location and connected to the other elements over a network (1412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storage retrieval, comprising:
receiving, from a computing device, a request for software application content,
wherein the request comprises a first field identifier, and
wherein the software application content is a user interface portion of a software application;
submitting, in response to the request, a query to a content repository, for at least one asset comprising the first field identifier;
receiving, from the content repository and in response to the query, a first asset comprising the first field identifier and a second asset comprising the first field identifier, the first asset and the second asset defining content for a same displayed portion of the user interface portion;
extracting a first variability tag from the first asset and a second variability tag from the second asset based on the first asset having a matching asset property value to the second asset, the first variability tag specifying a first context of the software application and the second variability tag specifying a second context of the software application;

selecting, from the first asset and the second asset, the first asset based on the first variability tag and the second variability tag; and transmitting, to the computing device, the first asset as the software application content.

2. The method of claim 1, further comprising:

receiving, from the content repository and in response to the query, a third asset comprising the first field identifier;

obtaining, from the content repository, a first parent group of the first asset and the second asset, and a second parent group of the third asset;

extracting a third variability tag from the first parent group and a fourth variability tag from the second parent group based on the first parent group and the second parent group each comprising at least one asset comprising the first field identifier;

scoring the first parent group at least on the third variability tag to obtain a first score;

scoring the second parent group at least on the fourth variability tag to obtain a second score; and selecting, from the first parent group and the second parent group, the first parent group based on the first score and the second score, wherein transmitting, to the computing device, the first asset as the application content comprises transmitting the first parent group.

3. The method of claim 2, wherein transmitting the first parent group comprises transmitting each selected asset in the first parent group and omitting any non-selected asset.

4. The method of claim 3, wherein each asset in the first parent group has a unique asset property value in the first parent group of a selected asset.

5. The method of claim 3, wherein the first parent group comprises at least one selected asset comprising a second field identifier and not the first field identifier.

6. The method of claim 3, wherein the first parent group comprises a fourth asset comprising the first field identifier, wherein the fourth asset is a selected asset based on the fourth asset having a unique asset property value.

7. The method of claim 6, wherein the first asset and the second asset are each a unique prompt for the user input field, and wherein the fourth asset is a second help guide for the user input field.

8. The method of claim 1, further comprising:

scoring the first asset based at least on the first variability tag to obtain a first score;

scoring the second asset based at least on the second variability tag to obtain a second score;

wherein the request further comprises a first plurality of variability tags, wherein the first asset comprises a second plurality of variability tags comprising the first variability tag, wherein scoring the first asset comprises:

matching the first plurality of variability tags to the second plurality of variability tags.

9. The method of claim 8, wherein scoring the first asset comprises:

for each variability tag in the first plurality of variability tags and the second plurality of variability tags, adding a defined value to the first score, and for each variability tag in the second plurality variability tags and not in the first plurality of variability tags, subtracting the defined value from the first score.

10. The method of claim 9, wherein the defined value varies according to variability tag.

11. A system for storage retrieval, the system comprising:

a content repository comprising:

a first storage device comprising a first asset comprising:

a first field identifier, a first asset property value, a first variability tag, and a first asset content, the first variability tag specifying a first context of the computer application, a second storage device comprising a second asset comprising:

the first field identifier, the first asset property value, a second variability tag, and a second asset content, the second variability tag specifying a second context of the computer application; and a first computing device for executing an asset context loader, the asset context loader configured to:

receive, from a second computing device, a request for software application content, wherein the request comprises the first field identifier, and wherein the software application content is a user interface portion of a software application;

submit, in response to the request, a query to the content repository, for at least one asset comprising the first field identifier;

receive, from the content repository and in response to the query, the first asset and the second asset;

extract the first variability tag from the first asset and the second variability tag from the second asset based on the first asset property value matching a second asset property value;

select the first asset based on the first variability tag and the second variability tag; and transmit, to the second computing device, the first asset as the software application content.

12. The system of claim 11, wherein the content repository further comprises:

a first parent group comprising the first asset and the second asset; and a second parent group comprising a third asset, the third asset comprising a first field identifier, a third variability tag, and a third asset content, wherein the asset content loader is further configured to:

receive, from the content repository and in response to the query, a third asset comprising the first field identifier;

obtain, from the content repository, the first parent group of the first asset and the second asset, and a second parent group of the third asset;

extract a third variability tag from the first parent group and a fourth variability tag from the second parent group based on the first parent group and the second parent group each comprising at least one asset comprising the first field identifier;

score the first parent group at least on the third variability tag to obtain a first score;

score the second parent group at least on fourth variability tag to obtain a second score; and select, from the first parent group and the second parent group, the first parent group based on the first score and the second score, wherein transmitting, to the second computing device, the first asset as the application content comprises transmitting the first parent group.

13. The system of claim 12, wherein the content repository further comprises:
a first parent group hierarchy comprising the first parent group; and
a second parent group hierarchy comprising the second parent group,
wherein the first parent group hierarchy is not relationally connected to the second parent group hierarchy in the content repository, and
wherein transmitting, to the second computing device, the first asset comprises transmitting the first parent group hierarchy.

14. The system of claim 11, wherein the content repository further comprises:
a plurality of possible variability tags, each of the plurality of possible variability tags assigned a corresponding defined score,
wherein the first asset comprises a second plurality of variability tags comprising the first variability tag,
wherein the asset content loader is further configured to:
score the first asset based at least on the first variability tag to obtain a first score; and
score the second asset based at least on the second variability tag to obtain a second score;
wherein the request further comprises a first plurality of variability tags, and wherein scoring the first asset comprises:
for each variability tag in the first plurality of variability tags and the second plurality of variability tags, adding the corresponding defined value to the first score, and
for each variability tag in the second plurality variability tags and not in the first plurality of variability tags, subtracting the corresponding defined value from the first score.

15. The system of claim 14, wherein the corresponding defined value varies according by possible variability tag.

16. A non-transitory computer readable medium for storage retrieval, comprising computer readable program code embodied therein that, when executed on a processor, causes the processor to perform operations for:
receiving a request for software application content, wherein the request comprises a first field identifier, and wherein the software application content is a user interface portion of a software application;
submitting, in response to the request, a query to a content repository, for each asset comprising the first field identifier;
receiving, in response to the query, a first asset comprising the first field identifier and a second asset comprising the first field identifier, the first asset and the second asset defining content for a same displayed portion of the user interface portion;
extracting a first variability tag from the first asset and a second variability tag from the second asset based on the first asset having a matching asset property value to the second asset, the first variability tag specifying a first context of the software application and the second variability tag specifying a second context of the software application;
selecting, from the first asset and the second asset, the first asset based on the first variability tag and the second variability tag; and transmitting the first asset as the software application content.

17. The non-transitory computer readable medium of claim 16, wherein the computer readable program code further causes the processor to perform operations for:
receiving, from the content repository and in response to the query, a third asset comprising the first field identifier;
obtaining, from the content repository, a first parent group of the first asset and the second asset, and a second parent group of the third asset;
extracting a third variability tag from the first parent group and a fourth variability tag from the second parent group based on the first parent group and the second parent group each comprising at least one asset comprising the first field identifier;
scoring the first parent group at least on the third variability tag to obtain a first score;
scoring the second parent group at least on fourth variability tag to obtain a second score; and
selecting, from the first parent group and the second parent group, the first parent group based on the first score and the second score,
wherein transmitting, to the computing device, the first asset as the application content comprises transmitting the first parent group.

18. The non-transitory computer readable medium of claim 17, wherein transmitting the first parent group comprises transmitting each selected asset in the first parent group and omitting any non-selected asset.

19. The non-transitory computer readable medium of claim 18, wherein each asset in the first parent group having a unique asset property value in the first parent group is a selected asset.

20. The non-transitory computer readable medium of claim 18, wherein the first parent group comprises at least one selected asset comprising a second field identifier and not the first field identifier.

21. The non-transitory computer readable medium of claim 18, wherein the first parent group comprises a fourth asset comprising the first field identifier, wherein the fourth asset is a selected asset based on the fourth asset having a unique asset property value.

22. The non-transitory computer readable medium of claim 21, wherein the first asset and the second asset are each a unique prompt for the user input field, and wherein the fourth asset is a second help guide for the user input field.

23. The non-transitory computer readable medium of claim 16, wherein the computer readable program code further causes the processor to perform operations for:
scoring the first asset based at least on the first variability tag to obtain a first score;
scoring the second asset based at least on the second variability tag to obtain a second score;
wherein the request further comprises a first plurality of variability tags,
wherein the first asset comprises a second plurality of variability tags comprising the first variability tag,
wherein scoring the first asset comprises:
matching the first plurality of variability tags to the second plurality of variability tags.

24. The non-transitory computer readable medium of claim 23, wherein scoring the first asset comprises:
for each variability tag in the first plurality of variability tags and the second plurality of variability tags, adding a defined value to the first score, and for each variability tag in the second plurality variability tags and not in the first plurality of variability tags, subtracting the defined value from the first score.

25. The non-transitory computer readable medium of claim 24, wherein the defined value varies according by variability tag.

* * * * *

UNITED STATES PATENT AND TRADEMARK OFFICE
CERTIFICATE OF CORRECTION

PATENT NO. : 10,810,021 B2
APPLICATION NO. : 16/183302
DATED : October 20, 2020
INVENTOR(S) : Jay JieBing Yu et al.

It is certified that error appears in the above-identified patent and that said Letters Patent is hereby corrected as shown below:

In the Claims

Claim 9, Column 32, Line 1, the word -- of -- should be inserted between the words "plurality" and "variability".

Claim 10, Column 32, Line 5, the word -- each -- should be inserted between the words "to" and "variability".

Claim 12, Column 32, Line 48, the word "content" should read -- context --.

Claim 12, Column 32, Line 62, the word -- the -- should be inserted between the words "on" and "fourth".

Claim 14, Column 33, Line 23, the word "content" should read -- context --.

Claim 14, Column 33, Line 33, the word "the", between the words "adding" and "corresponding", should read -- a --.

Claim 14, Column 33, Line 35, the word -- of -- should be inserted after the word "plurality".

Claim 15, Column 33, Line 40, the words "by possible" should read -- to each --.

Claim 42, Column 34, Line 19, the word -- the -- should be inserted between the words "on" and "fourth".

Claim 24, Column 35, Line 1, the word -- of -- should be inserted between the words "plurality" and "variability".

Claim 25, Column 35, at the end of Line 5, the word "by" should read -- to each --.

Signed and Sealed this
Twelfth Day of January, 2021

Andrei Iancu
*Director of the United States Patent and Trademark Office*